United States Patent
Davis

(10) Patent No.: US 9,365,153 B2
(45) Date of Patent: Jun. 14, 2016

(54) VEHICULAR INTERIOR SIGNAL LIGHTING SYSTEM

(71) Applicant: Code 3, Inc., St. Louis, MO (US)

(72) Inventor: John C. Davis, Eureka, MO (US)

(73) Assignee: Code 3, Inc., St. Louis, MO (US)

(*) Notice: Subject to any disclaimer, the term of this patent is extended or adjusted under 35 U.S.C. 154(b) by 144 days.

(21) Appl. No.: 14/213,281

(22) Filed: Mar. 14, 2014

(65) Prior Publication Data

US 2014/0268845 A1 Sep. 18, 2014

Related U.S. Application Data

(60) Provisional application No. 61/801,488, filed on Mar. 15, 2013.

(51) Int. Cl.
*B60Q 1/26* (2006.01)
*B60Q 1/52* (2006.01)

(52) U.S. Cl.
CPC .............. *B60Q 1/268* (2013.01); *B60Q 1/2661* (2013.01); *B60Q 1/2696* (2013.01); *B60Q 1/52* (2013.01)

(58) Field of Classification Search
CPC .... B60Q 1/2611; B60Q 1/2661; B60Q 1/268; B60Q 1/2696; B60Q 1/50; B60Q 1/52; B60Q 1/28; B60Q 1/302
See application file for complete search history.

(56) References Cited

U.S. PATENT DOCUMENTS

| | | | | |
|---|---|---|---|---|
| 4,488,141 A * | 12/1984 | Ohlenforst et al. | | 362/541 |
| 4,575,782 A * | 3/1986 | Levine et al. | | 362/503 |
| 5,243,502 A * | 9/1993 | Cappuccitti et al. | | 362/549 |
| 7,036,965 B2 * | 5/2006 | Dalton et al. | | 362/488 |
| 7,106,185 B1 * | 9/2006 | Neufeglise | | 340/468 |
| 2002/0109999 A1 * | 8/2002 | Strickland | | 362/542 |
| 2008/0080203 A1 * | 4/2008 | Neufeglise | | 362/540 |
| 2008/0164992 A1 * | 7/2008 | Ekladyous et al. | | 340/479 |
| 2009/0174541 A1 * | 7/2009 | Girouard | | 340/468 |
| 2010/0033982 A1 * | 2/2010 | Yeh | | 362/487 |
| 2012/0287662 A1 * | 11/2012 | Herberholt | | 362/542 |

\* cited by examiner

*Primary Examiner* — Peggy Neils
*Assistant Examiner* — Alexander Garlen
(74) *Attorney, Agent, or Firm* — Stoel Rives LLP

(57) ABSTRACT

A signal lighting system for a vehicle includes a housing having an open front end. A bottom and top of the housing each have an arcuate front edge. The bottom extends farther forward than the top so the front edge of the bottom is in front of the front edge of the top. The system includes a plurality of lights between the bottom and top and positioned for directing light generally forward. Gaskets are at the front edges of the top and bottom of the housing for conforming the lighting system to a windshield of the vehicle. The lighting system is adjustable to facilitate mounting the lighting system in a wide range of different makes and models of vehicle notwithstanding differences that may exist between their windshield geometries. The lights may be included in light modules that can be rotationally adjusted while the system is mounted on the vehicle.

13 Claims, 20 Drawing Sheets

VEHICULAR INTERIOR SIGNAL LIGHTING SYSTEM

CROSS-REFERENCE TO RELATED APPLICATION

This application claims priority to U.S. provisional application No. 61/801,488 filed Mar. 15, 2013, the entire contents of which are hereby incorporated by reference.

FIELD OF INVENTION

The present invention relates generally to signal lighting adapted to be positioned inside a police car or other vehicle, and more particularly to signal lighting that is adapted to be mounted at the top of a windshield inside the vehicle.

BACKGROUND

Signal lighting is commonly used in police department vehicles, fire department vehicles, road and utility department vehicles, and/or construction vehicles. Traditional signal lighting includes light bars that are mounted on the roof of a vehicle. There are several disadvantages that accompany externally mounted roof-top light bars. For example, these light bars make the car very conspicuous, which can be undesirable in some circumstance. The externally mounted roof-top light bars also have a negative impact on vehicle aerodynamics, which is associated with reduced gas mileage and also noise. Further, the fasteners for roof-top mounted light bars typically require openings to be drilled or otherwise formed in the roof. These openings can leak when it rains and can reduce resale value when it comes time to retire the vehicle from the fleet.

Some signal lighting has been adapted for being mounted inside a vehicle to avoid the foregoing problems. However, other problems can be encountered when signal lighting is mounted inside a vehicle. For example, the signal lighting needs to be visible from the exterior of the vehicle when the signal lighting is in use. Also, signal lighting inside the vehicle can be distracting to the driver and other people inside the vehicle, particularly if the signal lighting reflects off the vehicle windows or is otherwise visible to people within the vehicle.

The present inventors have developed an improved interior signal lighting system, which will be described below.

SUMMARY

One aspect of the invention is a signal lighting system adapted to be mounted inside a vehicle at the top of a windshield of the vehicle. The lighting system includes a housing comprising a bottom and a top. The housing has an open front end. The bottom and top of the housing each have an arcuate front edge. The bottom extends farther forward than the top so the front edge of the bottom is in front of the front edge of the top. The system includes a plurality of lights between the bottom and top and positioned for directing light generally forward. A top edge gasket is supported by the front edge of the top of the housing. The top edge gasket includes a mounting portion that is secured to the top of the housing so it is substantially fixed in the vertical direction relative to the front edge of the top of the housing. The top edge gasket also includes a flexible portion extending from the front edge of the top of the housing. The top edge gasket is configured to be bent upwardly by the interior surface of the windshield so the flexible portion of the top edge gasket extends upwardly from the front edge of the top of the housing along the inner surface of the windshield when the signal lighting system is installed in the vehicle.

Another aspect of the invention is a signal lighting system adapted to be mounted inside a vehicle at the top of a windshield of the vehicle. The lighting system has a housing including a bottom and a top. The housing has an open front end. The bottom and top each have an arcuate front edge. The bottom extends farther forward than the top so the front edge of the bottom is in front of the front edge of the top. The lighting system includes a plurality of lights between the bottom and top and positioned for directing light generally forward. The system also includes a bracket for attaching the housing to the vehicle at the location where the pivot arm of a sun visor is mounted on the vehicle. The bracket includes a retaining plate having a circular opening and a washer having a triangular shaped central opening. The washer is adapted engage the retaining plate and allow rotation of the retaining plate so the orientation of the triangular opening in the washer relative to the retaining plate can be adjusted.

Still another aspect of the invention is a signal lighting system adapted to be mounted inside a vehicle at the top of a windshield of the vehicle. The lighting system includes a housing including a bottom, a top, and a side wall extending between the top and the bottom of the housing at one side of the housing. The housing has an open front end. The bottom and top each having an arcuate front edge. The bottom extends farther forward than the top so the front edge of the bottom is in front of the front edge of the top. The system includes a plurality of lights between the bottom and top and positioned for directing light generally forward. A blind extends forward from the sidewall. The blind is moveable relative to the housing for adjusting the position of the blind relative to the vehicle windshield.

Yet another aspect of the invention is a signal lighting system adapted to be mounted inside a vehicle at the top of a windshield of the vehicle. The system includes a housing including a bottom, a top, and a side wall extending between the top and the bottom of the housing at one side of the housing. The housing has an open front end. The bottom and top each having an arcuate front edge. The bottom extends farther forward than the top so the front edge of the bottom is in front of the front edge of the top. The system also includes a plurality of lights between the bottom and top and positioned for directing light generally forward. At least some of the lights are part of a light module including a plurality of lights mounted on a base for conjoint movement with one another. The light module has an interface thereon adapted to interface with a tool to drivingly connect the tool to the light module. The bottom of the housing has an opening aligned with the interface for inserting the tool into the housing and into engagement with the interface to adjust the orientation of the light module without dismounting the housing from the vehicle.

Other objects and features will in part be apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
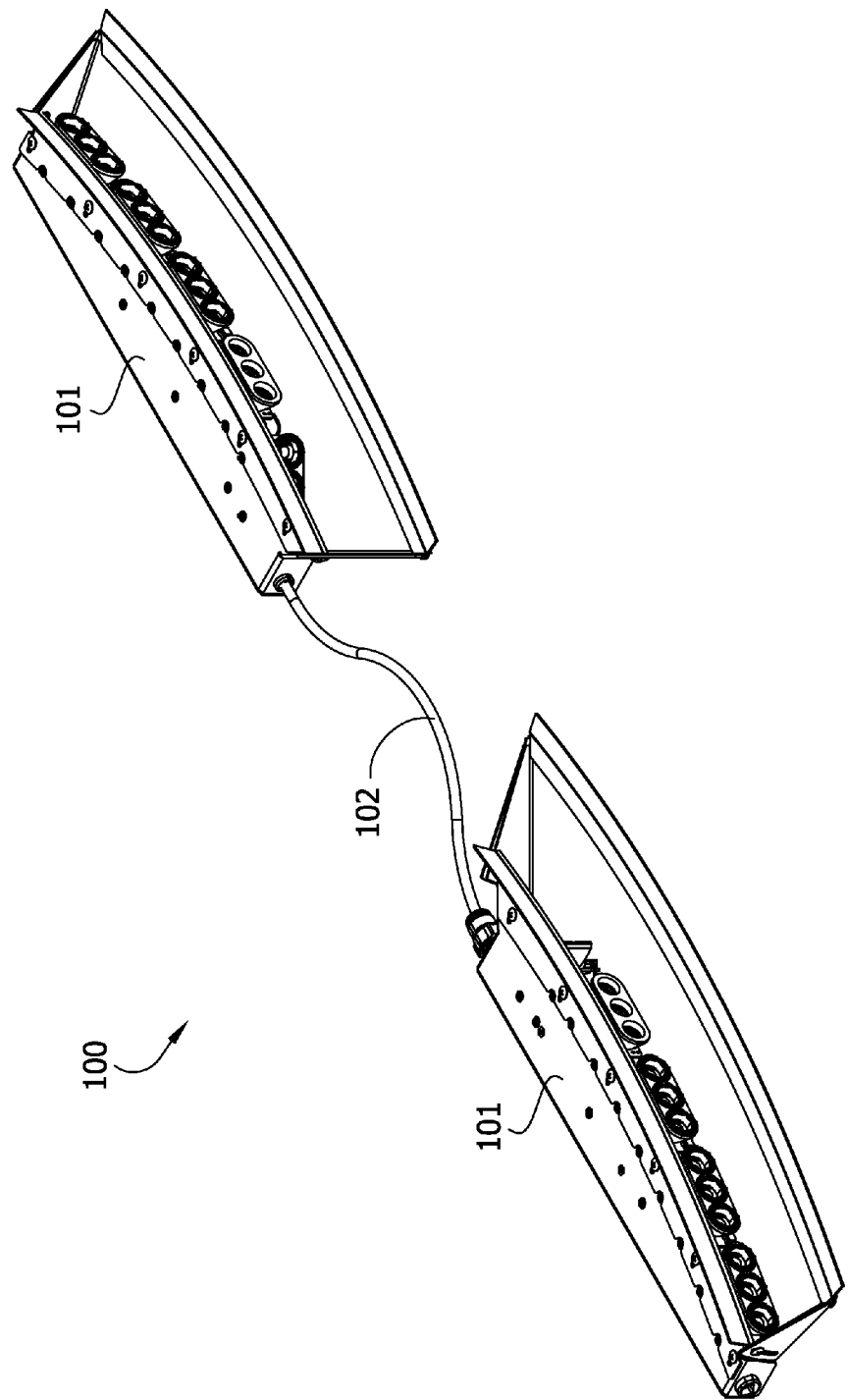
FIG. 1 is a perspective of one embodiment of a signal lighting system of the present invention.

Referring now to the drawings, FIG. 1 illustrates one embodiment of a signal lighting system, generally designated 100. The signal lighting system 100 is suitably adapted to be mounted inside a vehicle (not shown) at the top of the front windshield WS (see FIG. 8), although it is contemplated the lighting system could instead be installed at the top or bottom of the vehicle's rear window adjacent the inner surface thereof within the broad scope of the invention. If desired, the signal lighting system 100 can have a relatively low profile to avoid drawing attention to the signal lighting system, such as might be desired if the system is to be installed in an unmarked police car.

As illustrated in FIG. 1, the system 100 is a split visor system including a left component and a right component, each of which is designated 101. The components 101 are connected to one another by one or more electrical conductors (e.g., an electrical cable 102 containing a bundle of electrical wires) that transmits electrical power and control signals between the two components for coordinated operation. One of the components 101 is suitably mounted inside the vehicle generally on a right side of the rear view mirror and the other of the components is suitably mounted inside the vehicle generally on the left side of the rear view mirror. The electrical cable 102 is suitably a flexible cable adapted to facilitate routing the cable around the rear view mirror. For example, there is suitably sufficient slack in the cable 102 when the components are mounted in the vehicle to allow flexibility in the precise route of the cable between the two components 101. The components 101 are suitably mirror images of one another and may be substantially identical to one another, as in the illustrated embodiment. Thus a detailed description of one of the components 101 will suffice to explain them both. Although the embodiment illustrated in the drawings and described in detail herein is a split visor system designed so each component extends only part of the way across the windshield WS, it is understood the lighting system may have single component that extends all or only part of the way across the windshield within the scope of the invention.

Figure 3:
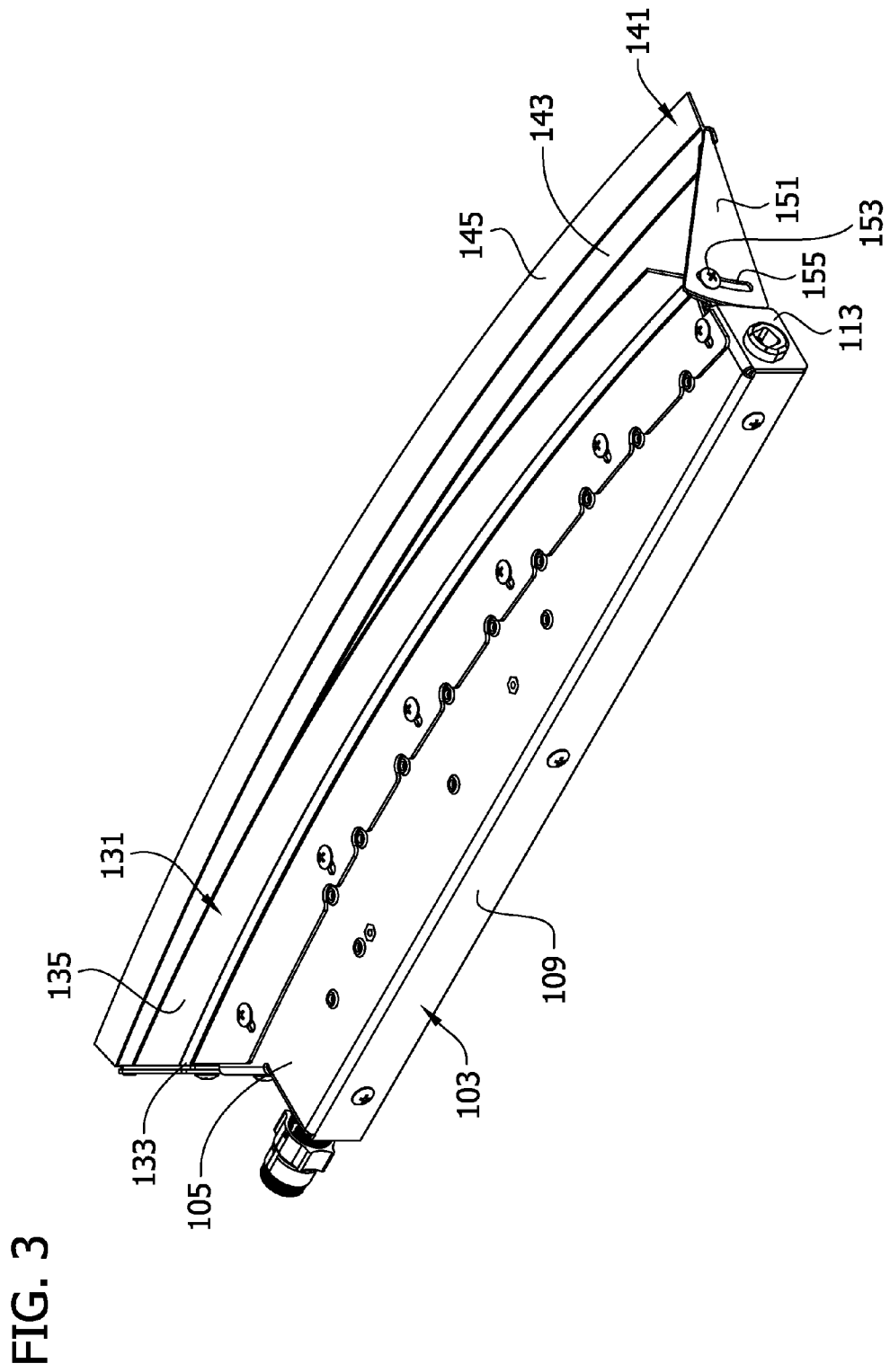
FIG. 3 is another perspective of the component illustrated in FIG. 2.
Figure 4:
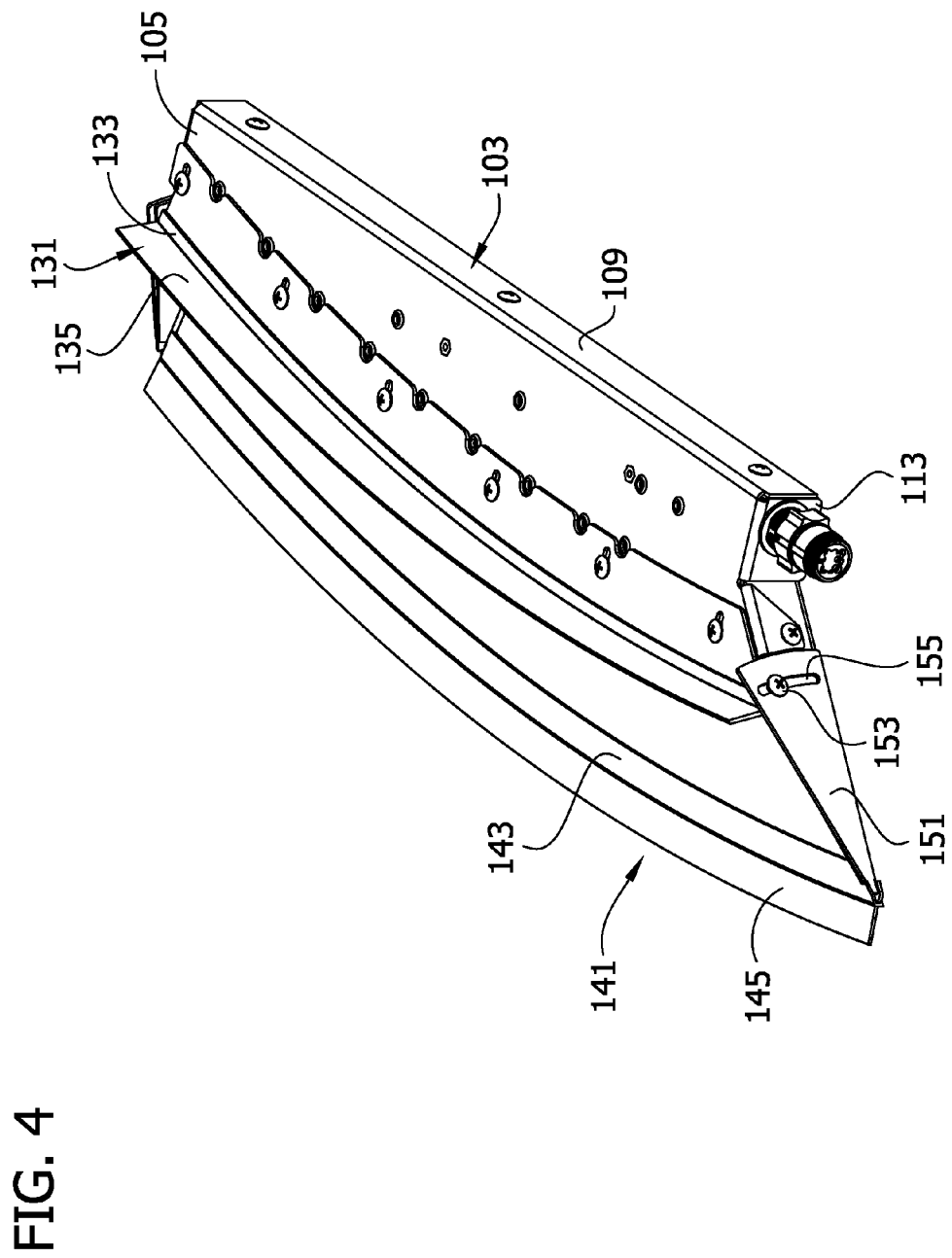
FIG. 4 is another perspective of the component illustrated in FIG. 2.
Figure 5:
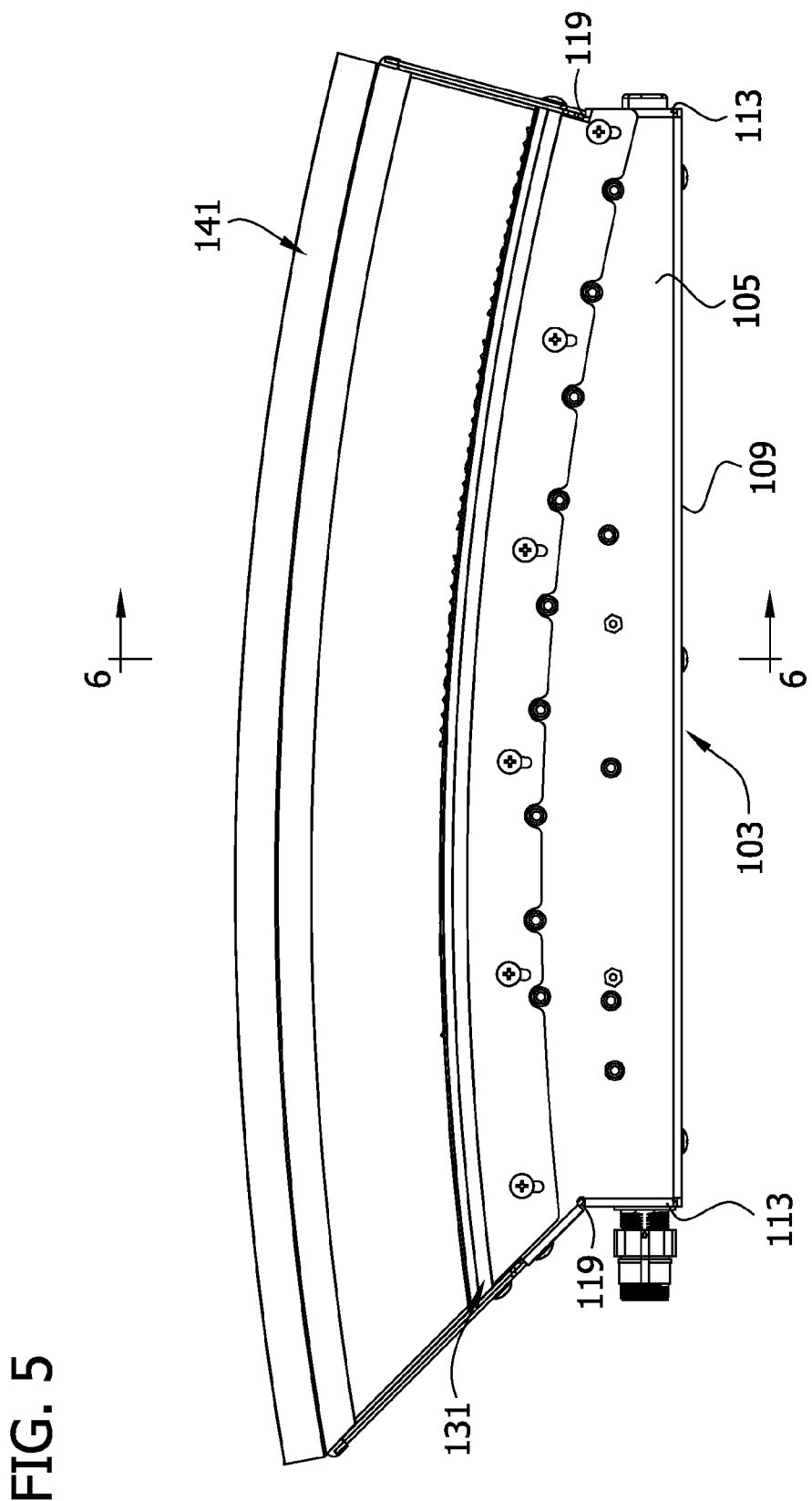
FIG. 5 is a top plan of the component illustrated in FIG. 2.

Referring now to FIGS. 2-7, each component 101 of the lighting system 100 includes a housing 103 comprising a bottom 107 and a top 105. The top 105 and bottom 107 are spaced from one another. For example, in the illustrated embodiment the top 105 and bottom 107 are spaced from one another by a back 109 of the housing that extends between the top and bottom. The housing has sides 113 extending forward from the back 109. The sides 113 extend between the top 105 and bottom 105. The housing 103 has an open front end 111 opposite the back 109, between the sides 113, and between the top 105 and bottom 107. As illustrated in FIG. 5, the sides 113 suitably extend outward as they extend forward from the back 109 so the open front end 111 is larger than the back of the housing 103. For example, the sides 113 suitably extend substantially perpendicularly from the back 109 of the housing 103 to bends 119 at which point the sides angle outwardly as they extend farther from the back of the housing. As illustrated, the top 105 and bottom 107 of the housing 103 are each substantially planar. The top 105 and bottom 107 are also substantially parallel to one another in the illustrated embodiment. It is recognized, however, that various other configurations of the housing are possible within the scope of the invention.

The various components of the housing 103, including the top 105, bottom 107, back 109 and sides 113, can be made separately or formed integrally with other parts of the housing within the scope of the invention. For example, portions of the sides 113 and/or back 109 can be formed integrally with the top 105 and/or bottom 107 (e.g., by bending a flap of material integrally formed with the top or bottom to form portions of the sides and/or back). The housing 103 is suitably made of metal, in which case bending one or more sheets of metal to make the housing or various components thereof may be desirable. Alternatively, the housing can be made in one or more pieces from a moldable material (e.g., plastic) within the scope of the invention.

A plurality of lights 121 (FIG. 2) are positioned between the bottom 107 and top 105 of the housing 103 and between the sides 113 of the housing. The lights 121 are oriented to direct light generally in a forward direction away from the back 109 of the housing 103. The lights 121 can be any lights that are suitable for providing signal lighting within the broad scope of the invention. For example, the lights 121 are suitably LEDs. The lights 121 may be adapted to emit colored light if desired to provide colored signal lighting in which the color of the lighting provides an indication of the type of vehicle using the signal lighting. For example, yellow and/or amber colors can be used for construction vehicles and motorist assist vehicles while various combinations of red, white and/or blue colors can be used for police, fire and other emergency vehicles. The lights 121 are suitably mounted in light modules 123, such as TriCore® LED light modules available from Code 3, Inc., a Public Safety Equipment Company, of St. Louis Mo., to provide just one example. Each light module 123 suitably includes a plurality of lights 121 mounted in fixed relation relative to one another. The lights 121 are suitably connected to a control (not shown) that provides power and signal lighting control for the system 100 via wiring (not shown), although it is also contemplated that the lights could be controlled by a wireless controller without departing from the scope of the invention.

Figure 6:
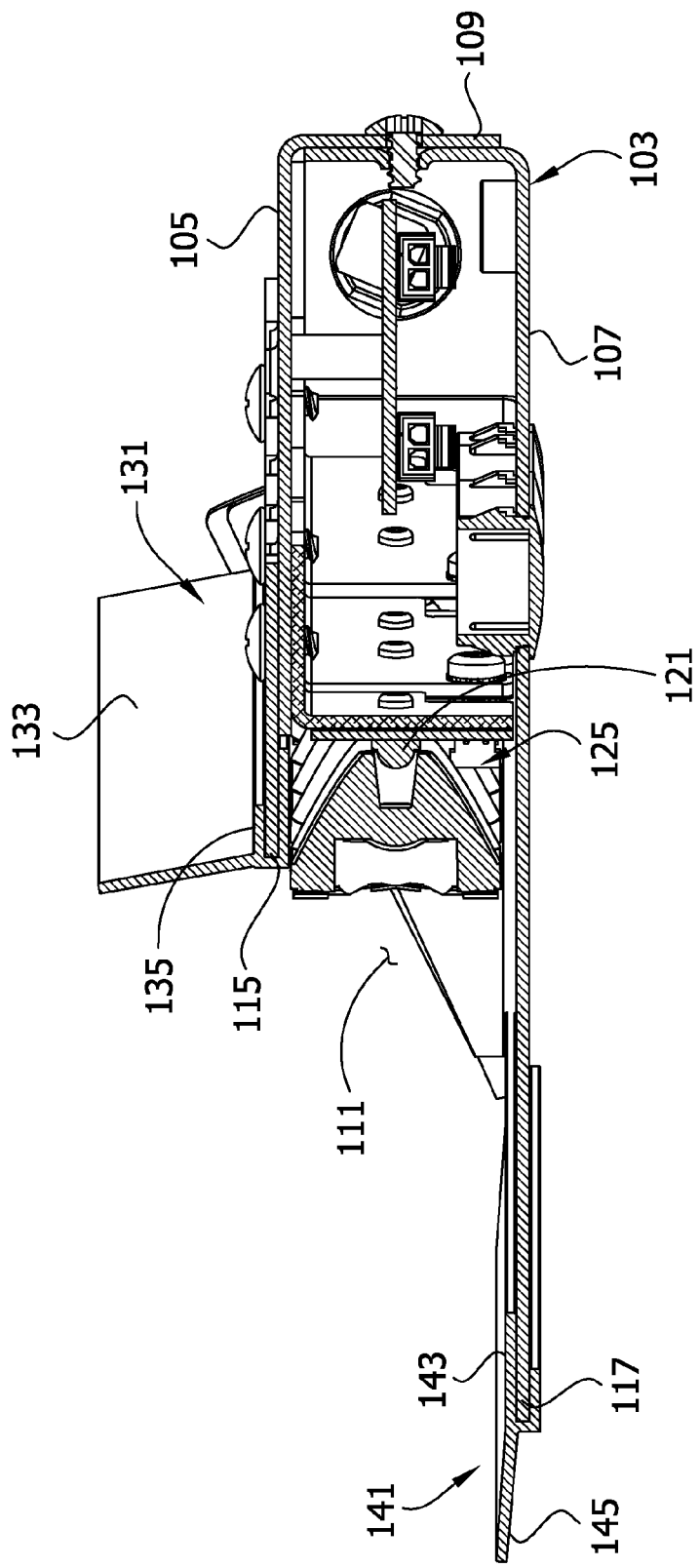
FIG. 6 is side elevation of a cross section of the component illustrated in FIG. 2 taken in a plane including line 6-6 on FIG. 5.
Figure 7:
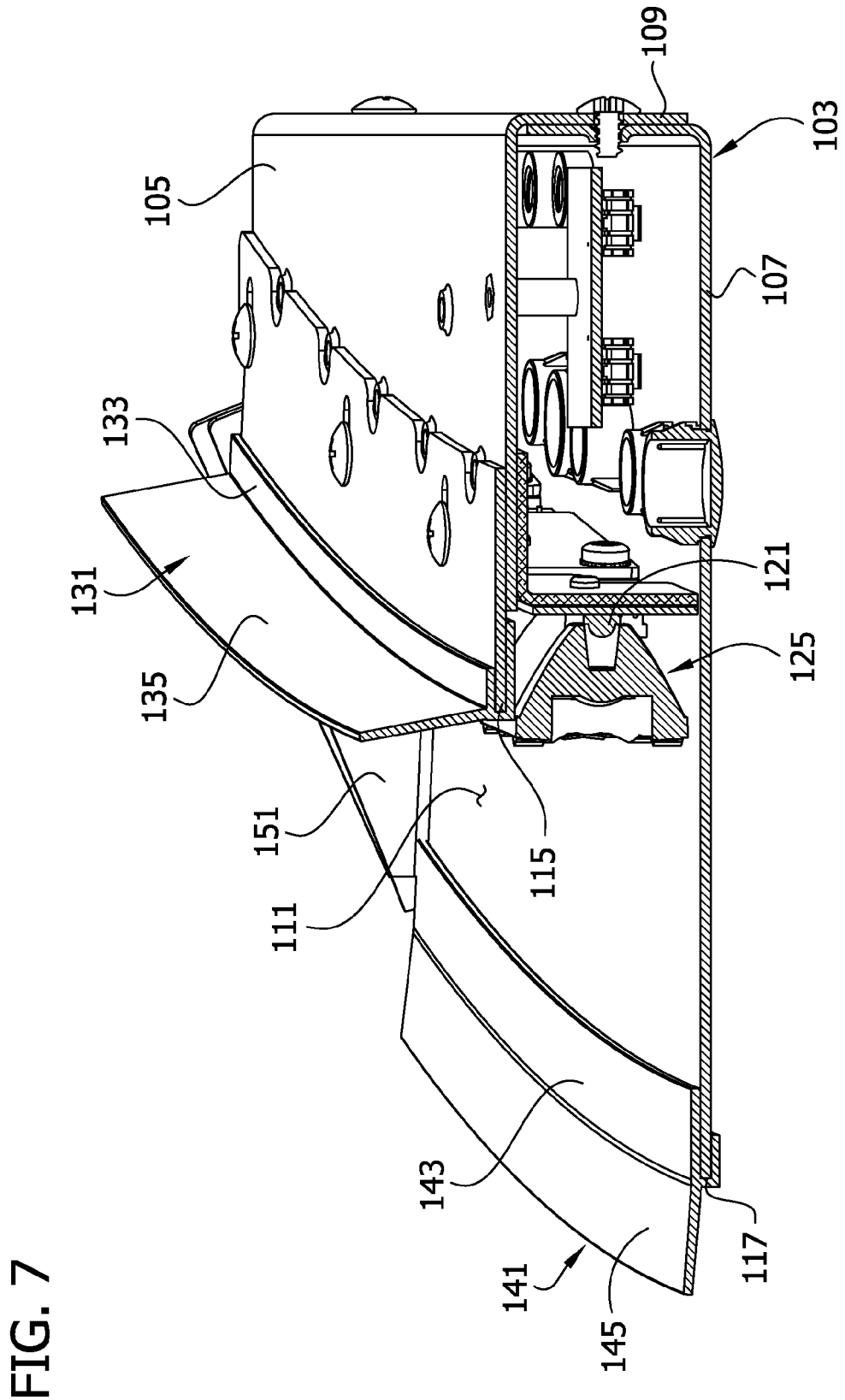
FIG. 7 is a perspective of the cross section illustrated in FIG. 6.
Figure 8:
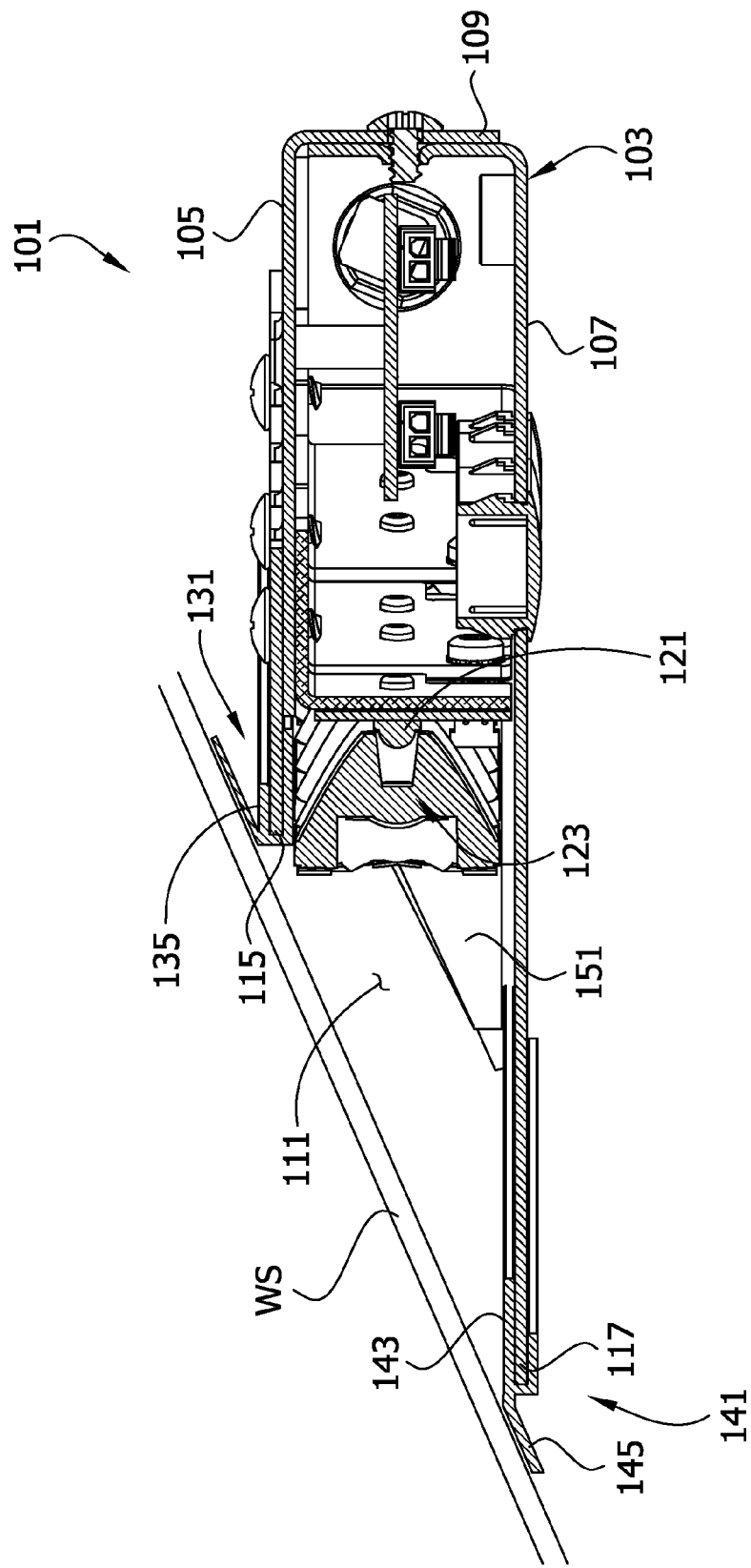
FIG. 8 is side elevation showing the component in cross section as illustrated in FIG. 6 mounted adjacent a windshield of a vehicle.

The bottom 107 of the housing 103 suitably extends farther forward from the back 109 of the housing than the top 105 does so the front edge 117 of the bottom is positioned in front of the front edge 115 of the top, as illustrated in FIG. 6. This facilitates positioning the housing 103 so the front edges 115, 117 of the housing 103 are each near the inner surface of an inclined front windshield WS of the vehicle, as illustrated in FIG. 8. Referring to FIG. 7, the bottom 105 and top 107 of the housing 103 each have an arcuate front edge, 115 and 117, respectively. The contours of the front edges 115, 117 of the housing 103 are suitably shaped to generally match the contour of an inner surface of a front windshield WS at the top near the roof. However, there are lots of variations in the shape of windshields for different makes and models of vehicle so there will likely be at least some deviation between the contours of the front edges 115, 117 of the housing 103 and the inner surface of the front windshield WS of a specific vehicle in which the signal lighting system 100 is to be installed. In some cases the variance between the shape of one or both of the front edges 115, 117 and the shape of the windshield WS can be relatively high.

Referring to FIGS. 4, 6, and 7, a top edge gasket 131 is supported by the front edge 115 of the top 105 of the housing 103. The top edge gasket 131 includes a mounting portion 133 that is secured to the top 105 of the housing 103 so the mounting portion of the top edge gasket is substantially fixed in the vertical direction relative to the front edge 115 of the top of the housing. For example, in the illustrated embodiment the mounting portion 133 of the top edge gasket 131 has a channel 137 (FIG. 9) extending inward from its edge. The front edge 115 of the top 105 of the housing is received in the channel 137. A friction fit between the channel 137 in the mounting portion 133 of the top edge gasket 131 and the front edge 115 of the top 105 of the housing 103 secures the top edge gasket to the front edge of the top of the housing.

Figure 2:
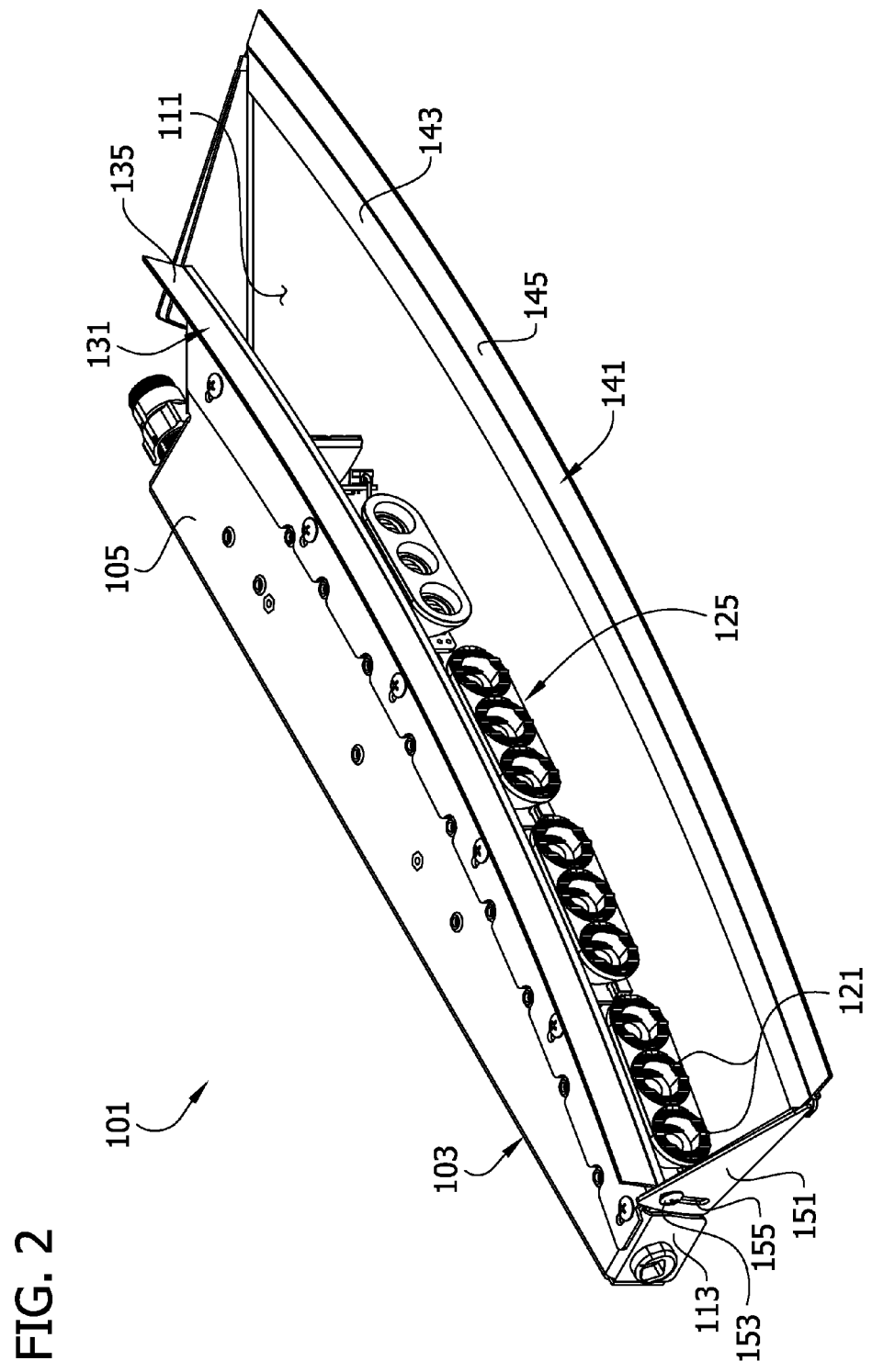
FIG. 2 is a perspective of one component of the lighting system.

The top edge gasket 133 also has a flexible portion 135 extending from the front edge 115 of the top 105 of the housing 103. The top edge gasket 131 is configured to be bent upwardly by the interior surface of the windshield WS, as illustrated in FIG. 8, so the flexible portion 135 of the top edge gasket suitably extends generally upwardly from the front edge 115 of the top 105 of the housing 103 along the inner surface of the windshield WS when the signal lighting 100 system is installed in the vehicle. For example, the top edge gasket 131 in the illustrated embodiment is configured so the flexible portion 135 of the top edge gasket extends from the mounting portion 133 at an angle when the top edge gasket is in an undeformed configuration, as illustrated in FIGS. 2-4.

The flexible portion 135 of the top edge gasket 131 suitably extends relatively far from the edge 115 of the top 105 housing 103. For example, as illustrated in FIG. 6 when the top edge gasket 131 is in its undeformed configuration, the flexible portion 135 of the top edge gasket 131 suitably extends from the front edge 115 of the top 105 of the housing 103 a distance D1, which is suitably at least about 0.25 inches, more suitably at least about 0.5 inches, and still more suitably at least about 0.75 inches, and still more suitably at least about 1 inch. The distance D1 that the flexible portion 135 of the top edge gasket 131 extends from the housing is suitably greater than the distance D2 (FIG. 9) the top edge gasket 131 extends rearward of the front edge 115 of the top 105 of the housing 103. Because the flexible portion 135 of the top edge gasket 131 extends a relatively long distance D1 from the front edge 115 of the housing 103, it has the capacity to deform a substantial amount if needed to conform to the curvature of the inner surface of the windshield WS.

Figure 9:
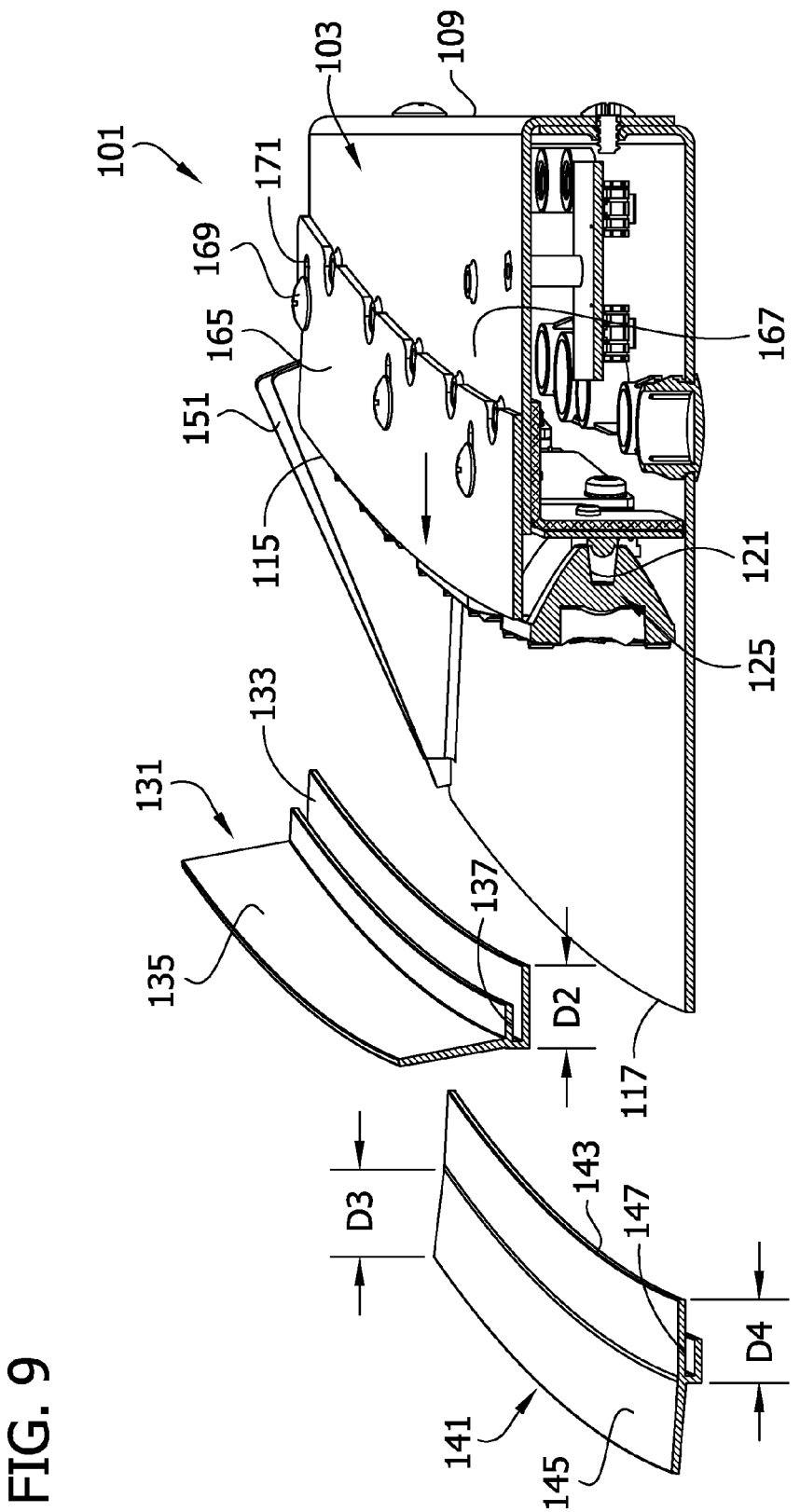
FIG. 9 is a partially exploded view of the cross section of the component illustrated in FIG. 6.
Figure 10:
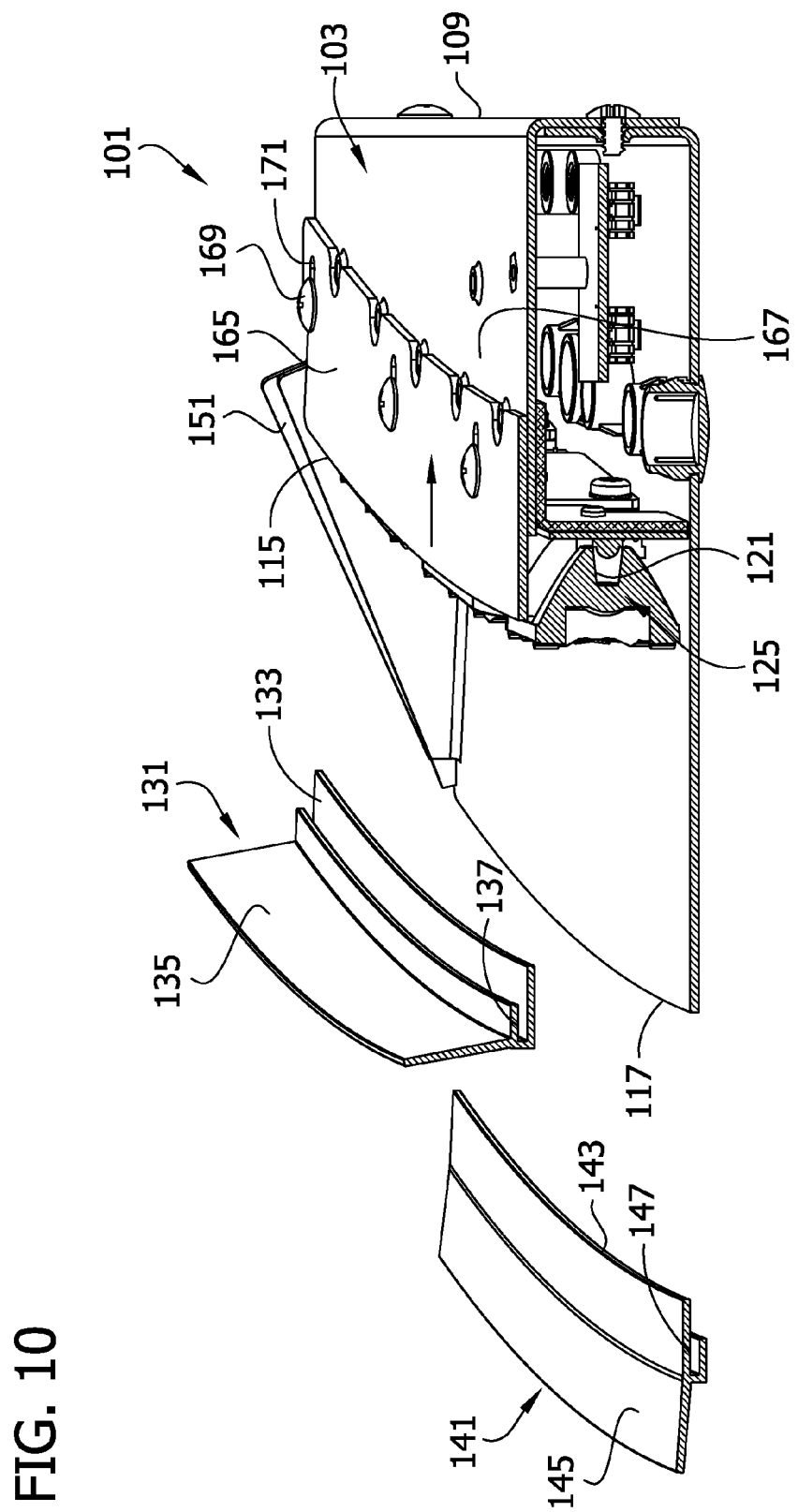
FIG. 10 is an exploded view similar to FIG. 9 illustrating adjustment to the position of a front end of a top of the housing of the component.

As illustrated in FIGS. 9 and 10, the position of the front edge 115 of the top 105 of the housing 103 is suitably adjustable relative to the back 109 of the housing. The position of the front edge 115 of the top 105 of the housing 103 is suitably also adjustable relative to the front edge 117 of the bottom 107 of the housing. The ability to adjust the front edge 115 of the top 105 of the housing 103 relative to other parts of the housing can provide additional capacity to adjust the position of the top edge gasket 131 if necessary to conform to the inner surface of the windshield WS. For example, in the illustrated embodiment, the top 105 of the housing 103 includes a forward plate 165 attached to a base plate 167 by screws 169 or other suitable fasteners received in slots 171 oriented to extend forwardly and rearwardly in the forward plate. When the fasteners 169 are loosened, the forward plate 165 can slide forward or rearward as indicated by the arrows in FIGS. 9 and 10. When the forward plate 165 is in the desired position, the fasteners 169 can be tightened to secure them in the slots 171 and limit further movement of the forward plate.

The lighting components 101 suitably include a bottom edge gasket 141 supported by the front edge 117 of the bottom 107 of the housing 103. As illustrated in FIGS. 2 and 9-10, the bottom edge gasket 141 suitably includes a mounting portion 143 that is secured to the bottom 107 of the housing 103 so the mounting portion is substantially fixed in the vertical direction relative to the front edge 117 of the bottom of the housing. The bottom edge gasket 141 also includes a flexible portion 145 extending forward from the front edge 117 of the bottom 107 of the housing 103. The flexible portion 145 of the bottom edge gasket 141 is suitably configured to be bent downwardly by the interior surface of the windshield WS so the flexible portion of the bottom edge gasket extends downwardly from the front edge 117 of the bottom 107 of the housing 103 along the inner surface of the windshield when the signal lighting system is installed in the vehicle, as illustrated in FIG. 8.

In contrast to the top edge gasket 131, in which the flexible portion 135 extends upward at an angle relative to the mounting portion 133 thereof and the top 105 of the housing 103, the bottom edge gasket 141 is suitably configured so the flexible portion 145 thereof is a generally flat strip of elastomeric material that extends generally horizontally forward from the front edge 117 when in an undeformed configuration. The mounting portion 143 suitably has a channel 147 (FIG. 9) for receiving the front edge 117 of the bottom 107 of the housing 103 therein. The channel 147 and front edge 117 of the bottom 107 of the housing are suitably dimensioned so a friction fit holds the bottom gasket 141 on the front edge when the front edge is received in the channel. The flexible portion 145 of the bottom gasket 141 suitably extends forward from the front edge 117 of the bottom 107 of the housing 103 a distance D3 that generally corresponds in length to the range of distances described above in connection with the distance D1 that the flexible portion 135 of the top gasket extends from the front edge 115 of the top 105 of the housing 103. In the illustrated embodiment, the distance D3 is slightly less than the distance D1. The mounting portion 143 of the bottom gasket 141 suitably extends rearward of the front edge 117 of the housing 103 a distance D4 that generally corresponds to the distance D2 that the mounting portion 133 of the top gasket extends rearward of the front edge 115 to the top 105 of the housing 103.

The curvatures of the arcuate edges 115, 117 and the top and bottom of the housing 103 and the dimensions D1 and D3 of the flexible portions 133, 143 of the top and bottom gaskets 131, 141 are suitably selected so the top and bottom gaskets can simultaneously conform to the inner surface of the windshield WS continuously along the top and bottom of the respective component 101 for a wide variety of different makes and models of vehicles, suitably including substantially all makes and models commonly adapted for use as police vehicles. Although it may be possible that the top and/or bottom gaskets 131, 141 might not be able to conform to the windshield of a few outlying makes and models of vehicles, it is contemplated that a signal lighting vendor may avoid the need to carry different models of the lighting system 100 for use with different makes and models of vehicles.

Figure 11:
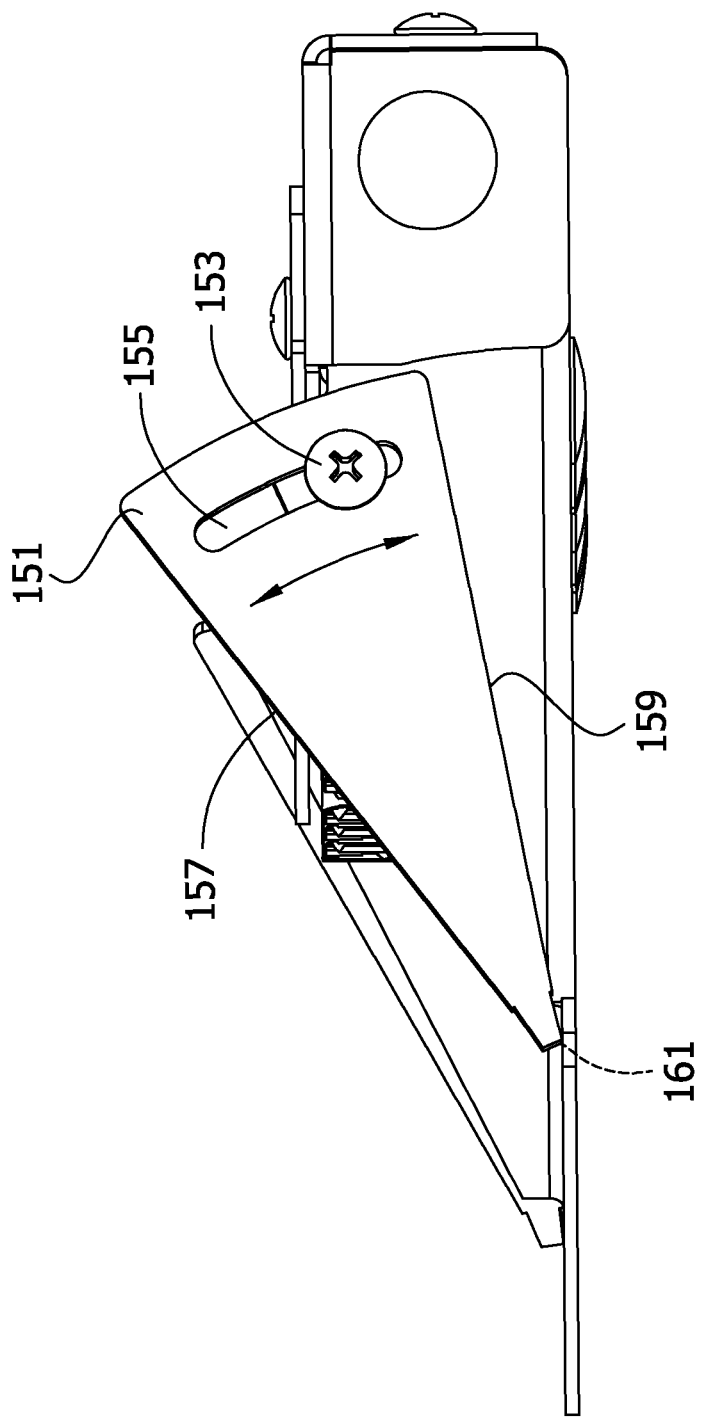
FIG. 11 is a side elevation of the component illustrating adjustment to a blind of the component.

Referring to FIGS. 2-3 and 11, the lighting components 101 each have blinds 151 extending forward from the opposite sides 113 of the housing. Each blind 151 is suitably moveable relative to the housing 103 for adjusting the position of the blind relative to the vehicle windshield WS. Moreover, the blinds 151 are suitably operable in conjunction with the top and bottom gaskets 131, 141 to block substantially all leakage of light from the lights 121 out of the housing 103 except through the windshield. This helps limit or avoid distractions caused by light from the lights 121 entering the interior of the vehicle where it may distract the driver or other people in the interior of the vehicle.

In the illustrated embodiment, each blind 151 is releasably secured to the housing 103 by a fastener 153 received in an arcuate slot 155 formed generally at one end of the blind. Each blind 151 suitably has a generally triangular shape. Top and bottom edges 157, 159 of the blinds 151 converge toward one another as they extend toward the front of the blind. The arcuate slot 155 at rear of the blind suitably has a center of curvature that defines a pivot axis 161 for the blind 151 generally at the front of the blind at about the point where the top and bottom edges 157, 159 converge toward. Thus, when the fastener 153 is loosened, the blind 151 can pivot relative to the housing 103 about the pivot axis 161. When the blind 151 is in the desired position, the fastener 153 can be tightened to limit further movement of the blind.

Figure 12:
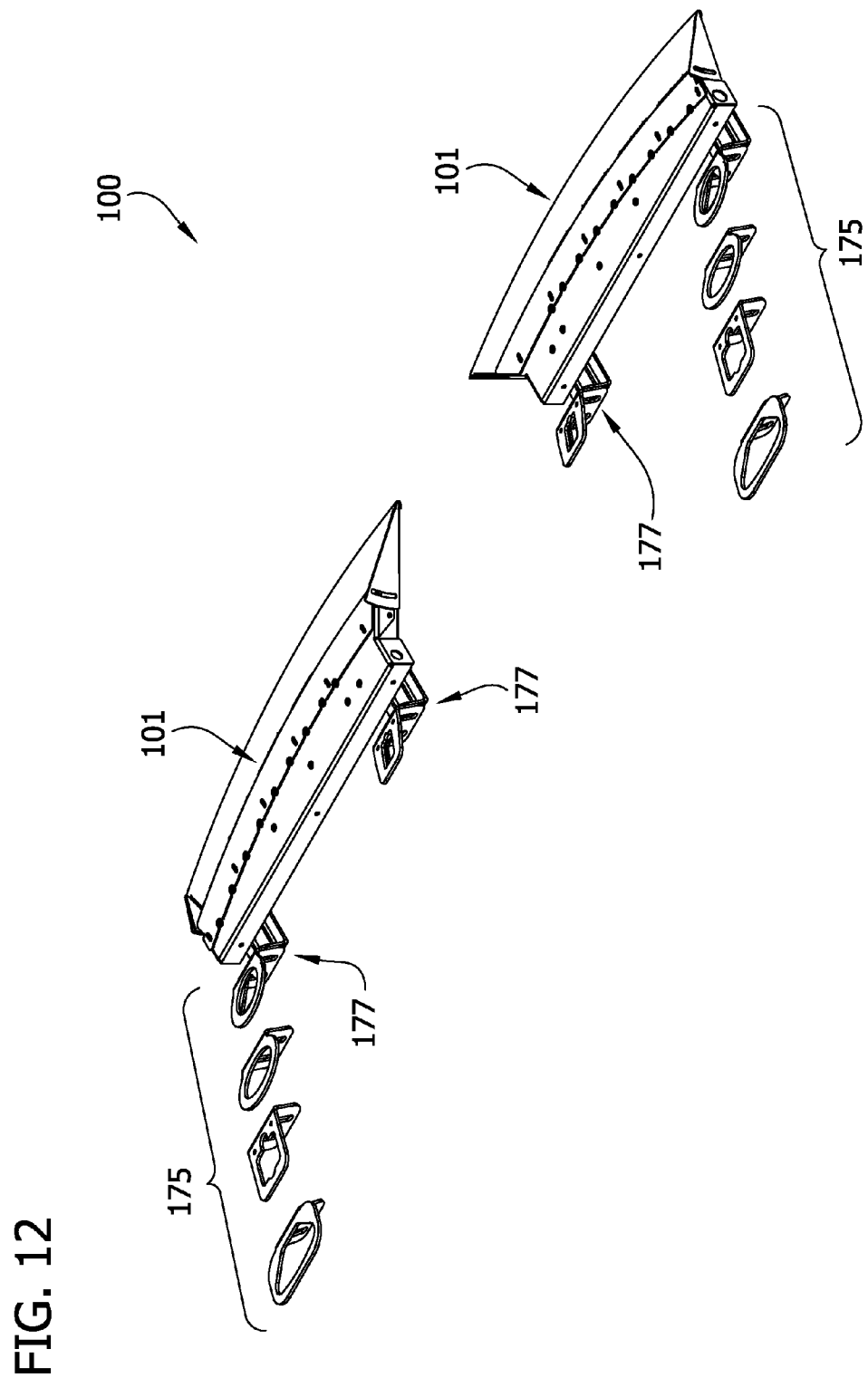
FIG. 12 is a perspective of the lighting system of FIG. 1 showing one embodiment a set of interchangeable brackets for mounting the lighting system on a vehicle.
Figure 13:
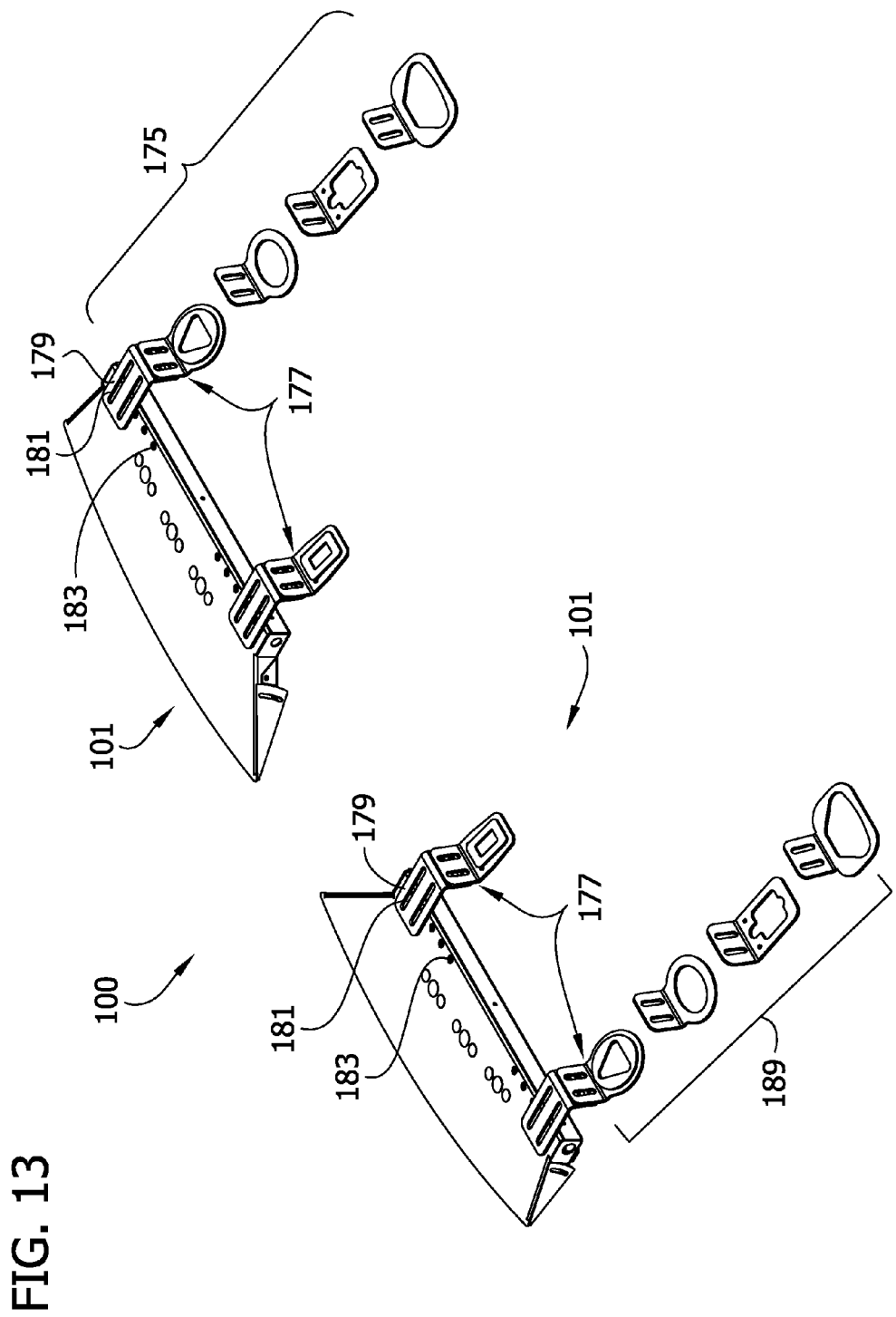
FIG. 13 is a perspective similar to FIG. 12 taken from a different vantage point.

Each component 101 of the light system 100 is adapted for being mounted in the interior space of a vehicle adjacent the windshield WS. In particular, the components 101 are suitably adapted for being mounted at the upper edge of the front windshield WS. For example, as illustrated in FIGS. 12 and 13, each component 101 has a set of mounting brackets, collectively designated 175, for securing the component to the vehicle sun visor clip brackets and/or to the sheet metal or other structural support above the vehicles headliner fabric.

Figure 14:
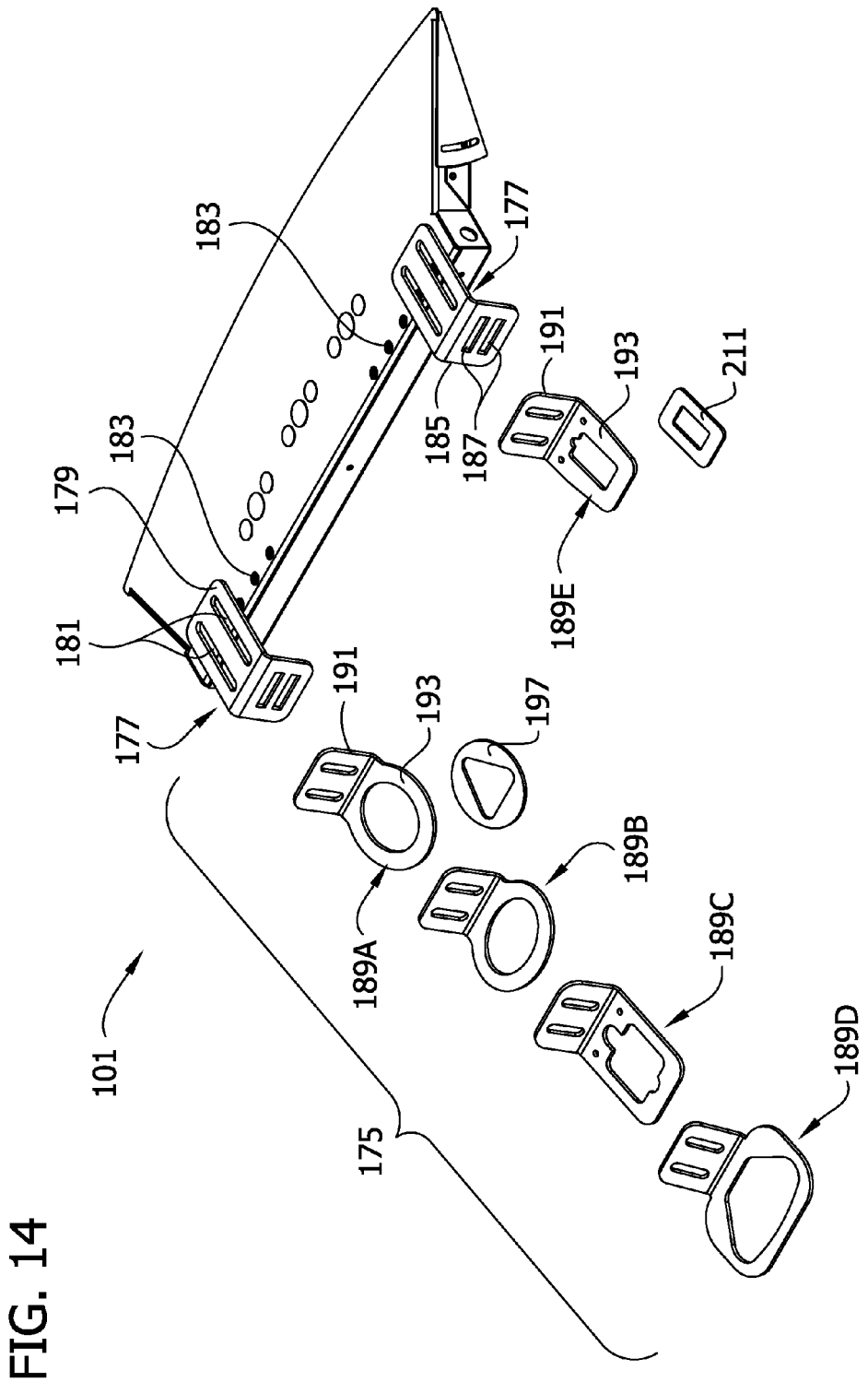
FIG. 14 is an enlarged perspective of one component of the lighting system showing some of the mounting brackets in an exploded configuration.
Figure 15:
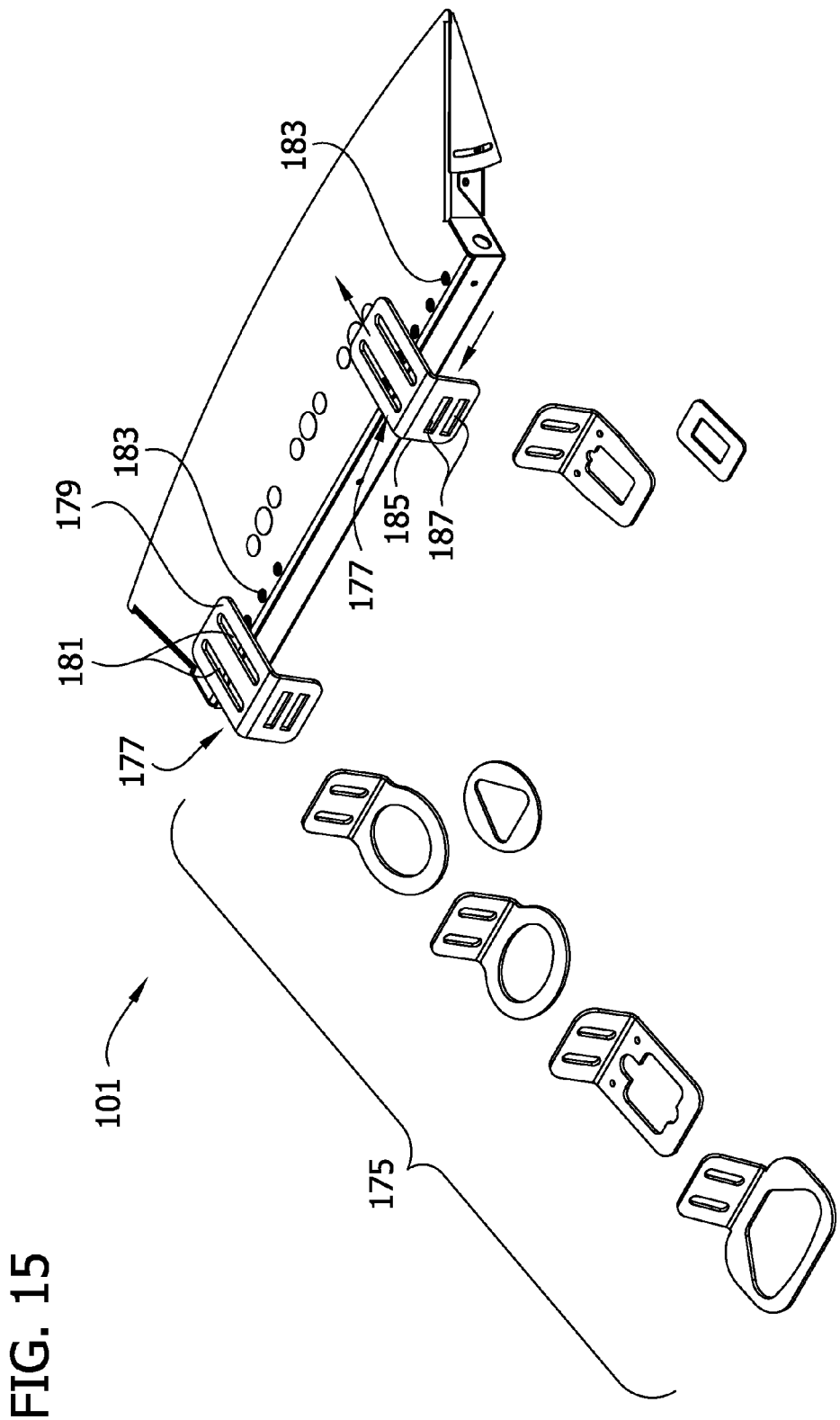
FIG. 15 is an enlarged perspective similar to FIG. 14 showing adjustment to a position of one of the mounting brackets.

The mounting brackets 175 for each component 101 of the lighting system 100 suitably include a pair of base brackets 177 adapted to be secured to the housing 103. For example, as illustrated in FIGS. 12-15, the base brackets are adapted to be secured to the bottom 107 of the housing near the back 109. In particular, each base bracket 177 includes a support plate 179 for supporting the component 101. A pair of parallel slots 181 in the support plate 179 are oriented to extend generally in the forward and rearward direction. The housing 103 suitably includes a series of connectors 183 (e.g., threaded inserts or the like) positioned to receive suitable fasteners, such as bolts or screws, (not shown) that are inserted through the slots 181 and into the connectors to secure the support plate 179 to the housing. Comparing FIGS. 14 and 15, the housing 103 suitably has multiple different sets of connectors to provide multiple different options for the position of the support plate 179 relative to the housing 103. For example, the slots 181 of the support plate 179 in FIG. 14 are aligned with connectors 183 nearer the side 113 of the housing 103 and the support plate 179 in FIG. 15 is aligned with connectors relatively farther from the side 113 of the housing. Thus, the multiple connectors 183 provide the option to secure the base bracket at multiple different distances from the sides 113 of the housing. Similarly, the slots 181 allow the support plate 179 to be secured to the housing 103 in a relatively more forward position (FIG. 15) or a relatively more rearward position (FIG. 14).

Each base bracket 177 has a mounting plate 185 extending upward from a rear edge of the support plate 179. Although other configurations are possible within the scope of the invention, the mounting plate 185 is suitably angled to extend away from the back 109 of the housing 103 as it extends up from the support plate 179, as illustrated in the drawings. The mounting plate 185 suitably has a pair of parallel slots 187 oriented to extend in a transverse (e.g., generally orthogonal) direction relative to the orientation of the slots 181 in the support plate 179.

For each base bracket 177, the mounting brackets 175, also include a set of coupling brackets 189. The coupling brackets 189 are adapted to join the base brackets 177 to the vehicle. Suitable locations for connecting to the vehicle are often provided by the mounts for connecting each of the vehicle's sun visors to the headliner near the outer edge of the windshield WS. Other suitable locations for connecting to the vehicle are often provided by the mounts for the support clips that allow the unattached ends of the sun visors to be releasably secured to the headliner. Different makes and models of vehicle use different types of mounts for the sun visors and the sun visor clips. Thus, the mounting brackets 175 suitably include a plurality of different coupling brackets 189 that can be used interchangeably depending on the type of coupling bracket that works best with the available mounting structure in a particular vehicle. An entire set of coupling brackets 189 for each light component 101 is suitably included in a package in which one or more light components are sold (e.g., as part of an included mounting kit) to allow a user to pick the particular coupling bracket that is to be used with a particular vehicle in which that light component is to be mounted.

Various different coupling brackets 189 can be included in the set of mounting brackets 175 within the scope of the invention. In general, each coupling bracket 189 in the illustrated embodiment includes a coupling plate 191 for connecting to the mounting plate 185 of the respective base bracket 177 and a retaining plate 193 extending from the coupling plate. The coupling plate 191 is suitably angled relative to the retaining plate 193 so the angle of the coupling plate generally matches the angle of the mounting plate 185 of the base bracket when the support plate 179 of the base bracket 177 is substantially horizontal and the retaining plate is secured to the vehicle. For example in the illustrated embodiment, the coupling plate 191 extends at an angle down and forward relative to the retaining plate 193. The coupling plate 191 suitably includes a pair of parallel slots 195 (FIG. 16) that are oriented transversely (e.g., substantially orthogonally) to the slots 187 in the mounting plate 185.

Figure 16:
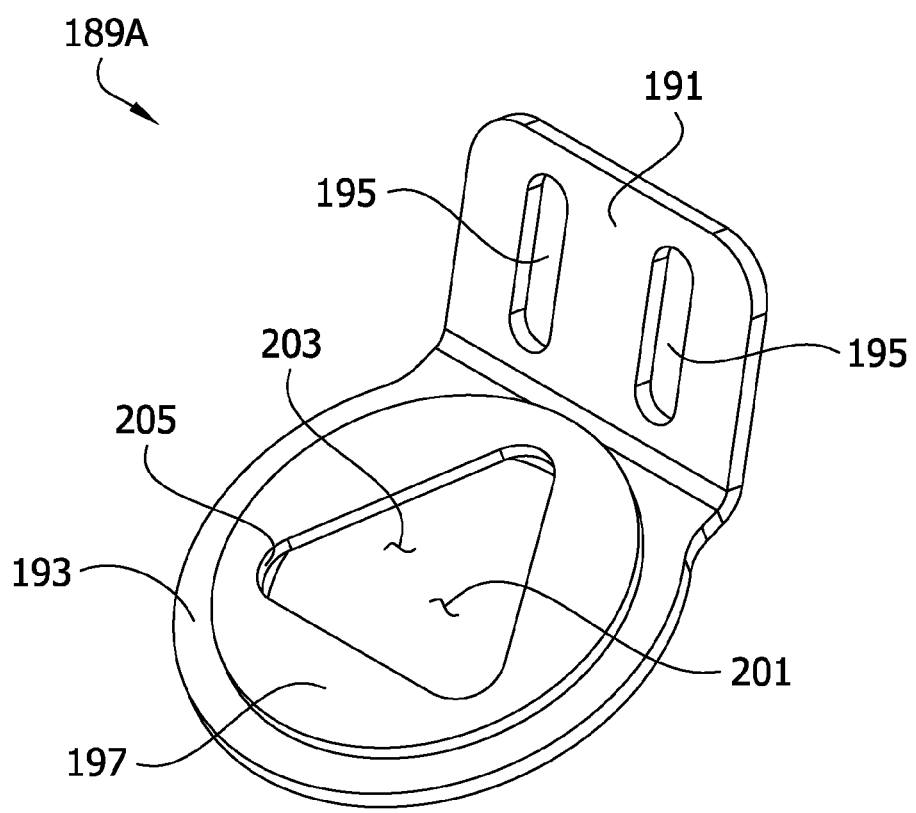
FIG. 16 is a perspective of one embodiment of a coupling bracket for coupling the lighting component to the pivot mount of a vehicle's sun visor.
Figure 17:
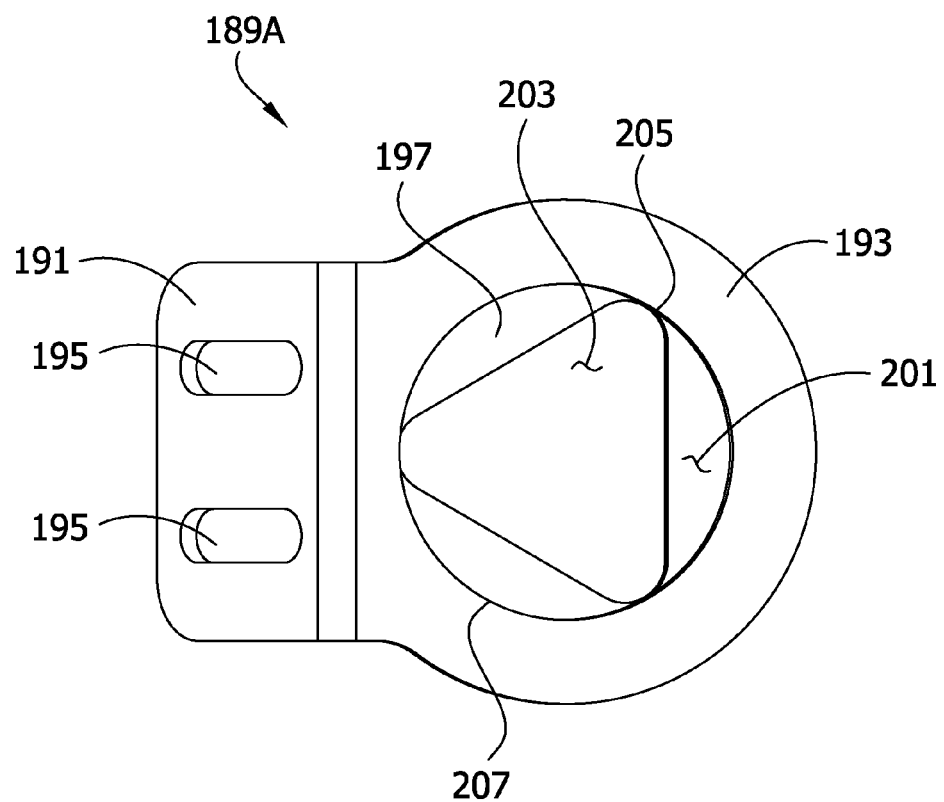
FIG. 17 is a plan view of the coupling bracket shown in FIG. 16.

One example of a suitable coupling bracket is illustrated in FIGS. 16-17 and is designated 189A. It has a generally circular opening 201 in its retaining plate 193. The coupling bracket 189A with the circular opening can optionally be used in conjunction with a washer 197 having a triangular opening 203. The triangular opening 203 is sized and shaped to engage the perimeter of a triangular component (not shown) that is used in one of the most common types of sun visor pivot mounts currently in use. If the retaining plate 193 had a corresponding shaped triangular opening, the ability of the retaining plate to rotate would be very limited. Conversely, there could be a lot of play in the connection between the coupling bracket 189 and the vehicle if the retaining plate 193 having the larger circular opening 201 of bracket 189A were used without the triangular washer 197.

Referring to FIGS. 16-17, when the coupling bracket 189A having the circular opening 201 is used in combination with the washer 197 having the triangular opening 203, the coupling bracket 189A is able to rotate and the amount of lateral play is limited. As illustrated in FIG. 16, the washer 197 is suitably positioned on the same side of the retaining plate 193 as the coupling plate 191. Moreover, as illustrated in FIG. 17, the outermost points 205 of the triangular opening lie on the perimeter 207 of the circular opening 201. Thus, when the triangular component (not shown) of the vehicle's sun visor pivot mount is received in the triangular and circular openings 201, 203, the washer 197 is held in registration with the retaining plate 193 of the bracket 189A. In particular, the triangular component on the vehicle suitably abuts the perimeter 207 of the circular opening 201 at each vertex to prevent lateral movement of the retaining plate 193. However, the retaining plate 193 can rotate about a center of the circular opening 203 relative to the washer 197 and the triangular component of the vehicle. At the same time, the washer 197 can fit relatively snugly around the triangular component of the vehicle to minimize gaps and help limit the amount of play.

Referring to FIG. 14, other suitable coupling brackets 189 that can be included in the set 175 include a bracket 189B having an oval opening in the retaining plate 193, a bracket 189C having a rectangular opening in the retaining plate 193, a bracket 189D having a generally trapezoidal opening in the retaining plate 193, and a bracket 189E having an opening sized and shaped for use with mounting structure used to secure a sun visor clip to the vehicle and similarly shaped washer 211. Brackets 189A, 189B, 189C, and 189D are generally more suitable for use on the side of the component 101 closest to the side of the vehicle, while bracket 189E is generally more suitable for use on the side of the component located more centrally. Other coupling brackets different than those shown in the drawings can be included and/or various coupling brackets in the illustrated embodiment can be excluded within the scope of the invention. Although it is envisioned a relatively small set of coupling brackets 189 can provide means for connecting to most vehicles, it is recognized that there may be a need to improvise in some cases (e.g., by trimming parts of the brackets to make them fit) without departing from the scope of the invention.

Figure 18:
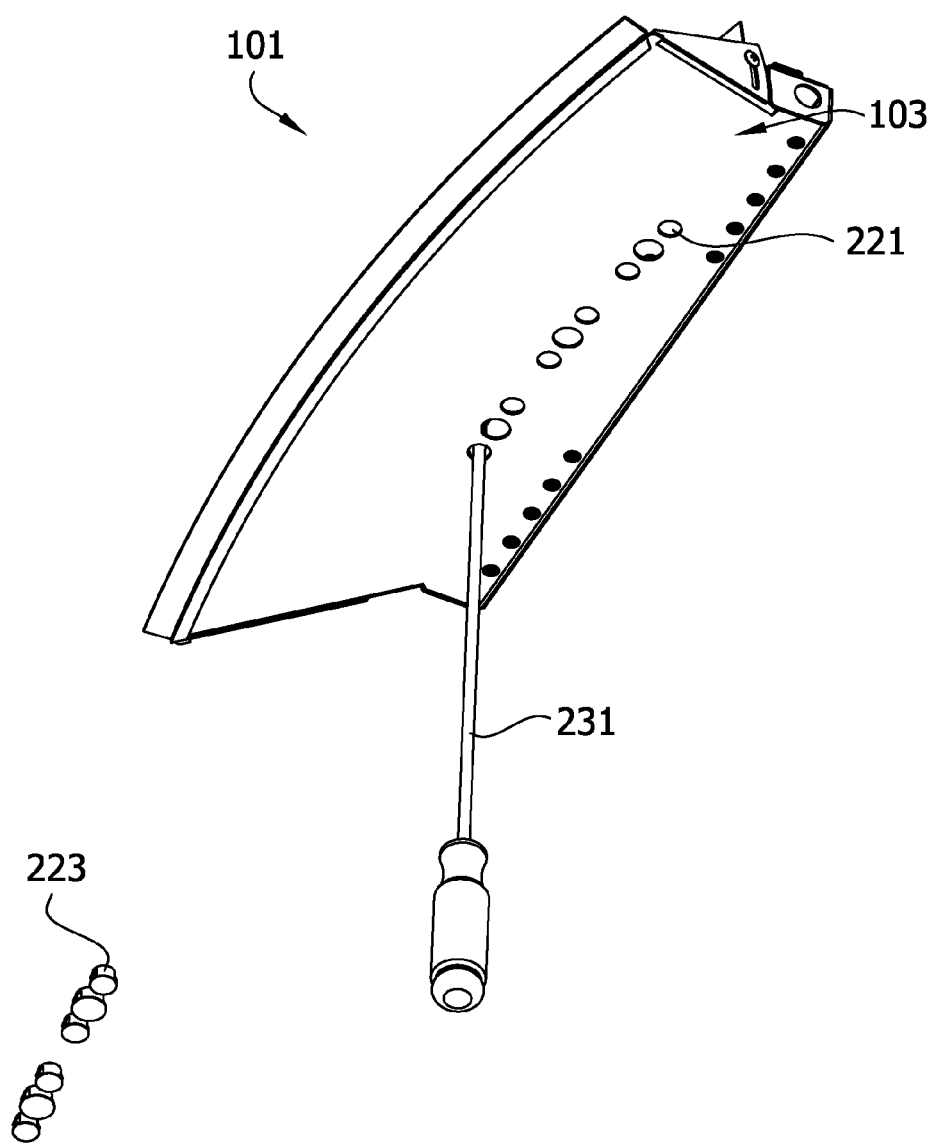
FIG. 18 is a perspective of one of the lighting components during the course of adjustment to the position of a light module in the component according to one embodiment of the invention.
Figure 19:
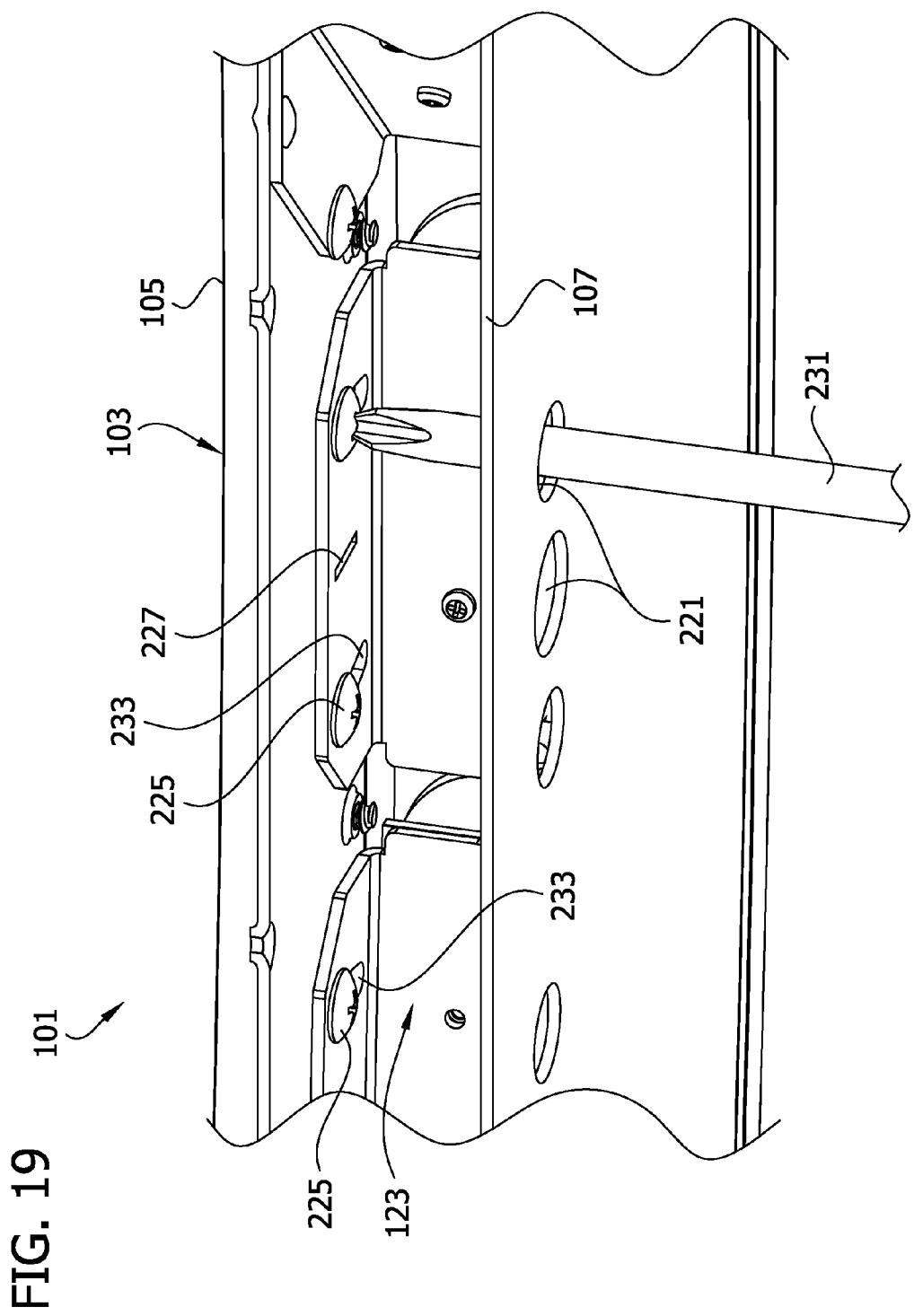
FIG. 19 is an enlarged perspective of the lighting component with the back of the housing removed to show internal features, including features involved in one method of rotating a light module of the light component.
Figure 20:
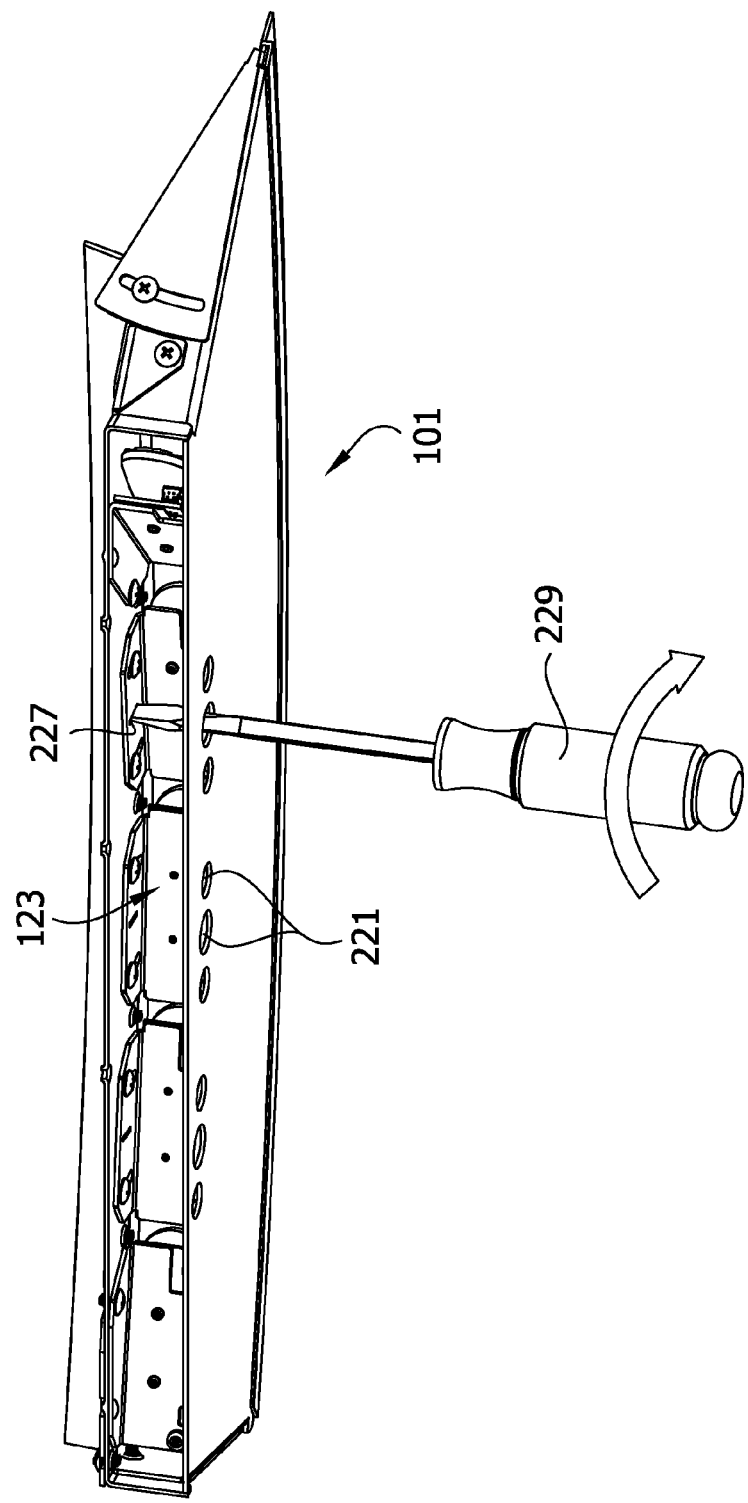
FIG. 20 is a perspective similar to FIG. 19 showing use of a tool to rotate the light module.

The light components 101 suitably each allow rotational adjustments to one or more of the light modules 123 without disconnecting the light components from the vehicle. Referring to FIGS. 18-20, for example, the bottom 107 of the housing 103 suitably has a plurality of openings 221 that are normally plugged by releasable caps 223. In the illustrated embodiment, the openings 221 are arranged in sets of three and each of the rotationally adjustable light modules 123 is secured to the housing by a pair of fasteners (e.g., screws) that are generally aligned with the two outermost openings in a set of openings. The fasteners 225 are suitably secured to the top 105 of the housing 103 and extend through arcuate slots 233 in the light module 123. The light module 123 also has an interface 227 (e.g., straight slot) for a tool 229 (e.g., flathead screwdriver) positioned between the two fasteners 225 and in general alignment with the central opening 221 in the set of three openings. Accordingly, the openings 221 provide access for one or more tools to the fasteners 225 and interface 227 (e.g. a flathead screwdriver 229 for the interface and a Phillips head screwdriver 231 for the fasteners). In the illustrated embodiment, three of the light modules 123 are adjustable. In particular, the three central light modules 123 out of five total per component 101 are adjustable in the illustrated embodiment. However, any number of light modules from zero to all of the light modules can be rotationally adjustable within the scope of the invention.

According to one method of installing the lighting system 101 a worker holds each lighting component up next to the windshield WS at the location it will be installed (e.g. at the top of the front windshield, as illustrated in FIG. 8. The worker then pushes the top and bottom gaskets 131, 141 against the windshield WS to deform them (e.g., as illustrated in FIG. 8) and form a continuous light proof barrier between the windshield and the top 105 and bottom 107 of the housing. If necessary, the position of the front edge 115 of the top 105 of the housing 103 is adjusted by loosening the fasteners 169 within the slots 171 and moving the plate 165 forward or rearward depending on the need. Then the fasteners 169 are tightened to limit further movement of the plate 165.

The mounting structures for the vehicle's sun visor are disassembled and the coupling brackets 189 that are selected for use with the particular mounting structures in that particular vehicle. For example, the retaining plates 193 (and washers 197, 211 if they are used) are positioned underneath the outer most component of the vehicle's sun visor mounting structures and sun visor clip mounting structures so that the retaining plates are retained in place by the sun visor mounting structures. Fasteners are used to connect the base brackets 177 to the coupling brackets 189 and to connect the base brackets to the housing 103. During the various steps involved in connecting the housing 103 to the vehicle using the base brackets 177 and coupling brackets 189 numerous adjustments to the positions of the brackets are possible to achieve the objective of having the housing secured to the vehicle so the bottom 107 of the housing is substantially level, which can be important for optimal operation of the lighting system 100. In particular, some or all of the following adjustments can be made: one or more base brackets 177 can be adjusted laterally relative to the housing 103 by selecting a different set of connectors 183 to align with the slots 181 in the base bracket; the forward/rearward position of one or more base brackets can be adjusted relative to the housing and held in the desired position by tightening fasteners extending through the slots 181 into the connectors 183 in the housing; and the positions of the coupling plates 191 relative to the mounting plates 185 can be adjusted by sliding them across one another and then tightening fasteners received in the slots 187, 195 to hold them in the desired position. When the adjustments are complete, the light component is suitably secured to the vehicle and positioned adjacent the front windshield so the top and bottom gaskets 131, 141 for a substantially continuous seal against the windshield along the top 105 and bottom 107 of the housing from one end of the light component 101 to the opposite end.

Once the top and bottom gaskets 131, 141 are sealed to the windshield, the blinds 151 can be adjusted if necessary by loosening the fasteners 153, pivoting the blinds about their pivot axes 161 until the upper edges 157 of the blinds 151 contact the inside surface of the windshield WS, and then tightening the fasteners 153 to hold the blinds in position.

At any time after the lighting system 100 is secured to the vehicle, either as part of the installation process or later, the orientation of any adjustable light modules 123 can be changed as may be desired, for example to position takedown lights so they are directed in a desired orientation. To adjust the orientation of the light modules 123, the caps 223 are removed from the openings 221 for the light module that is to be adjusted. Then, a tool, such as a Phillips head screwdriver 231 is inserted through one of the openings and used to loosen the fasteners 225 holding the light module 123 in place. Once the fasteners are loose enough to slide the light module 123 relative to the housing 103, a tool such as a flat head screwdriver 229 is inserted through the corresponding opening 221 to engage the interface 227 and twist the light module about a vertical axis aligned with the interface into the desired orientation. Once the light module 123 is in the desired orientation, the fasteners are tightened and the caps 223 are replaced.

When introducing elements of the present invention of the preferred embodiments thereof, the articles "a", "an", "the", and "said" are intended to mean that there are one or more of the elements. The terms "comprising", "including", and "having" are intended to be inclusive and mean that there may be additional elements other than the listed elements.

In view of the foregoing, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A signal lighting system adapted to be mounted inside a vehicle at the top of a windshield of the vehicle, the vehicle having a sun visor mounted inside the vehicle at the top of the windshield, the sun visor including at an outermost end a pivot arm mounting structure and at an innermost end a visor clip mounting structure, the lighting system comprising:

a housing comprising a bottom, a top, and a back extending between the top and the bottom of the housing, the housing having an open front end, the bottom and top each having an arcuate front edge, the bottom extending farther forward than the top so the front edge of the bottom is in front of the front edge of the top;

a plurality of lights between the bottom and top and positioned for directing light generally forward;

a sun visor pivot arm mounting base bracket and a sun visor clip mounting base bracket each of which including a first portion and a second portion, the first portion of the pivot arm mounting base bracket configured to be positioned around or underneath the pivot arm mounting structure and the first portion of the clip mounting base bracket configured to be positioned around or underneath the visor clip mounting structure, and the second portion of each of the pivot arm mounting base bracket and the clip mounting base bracket connected to the housing and extending rearward from the back of the housing to a location that maintains an operational clearance for the sun visor away from the back of the housing when the sun visor is attached to the pivot arm and visor clip mounting structures; and a top edge gasket supported by the front edge of the top of the housing, the top edge gasket comprising a mounting portion that is secured to the top of the housing so it is substantially fixed in the vertical direction relative to the front edge of the top of the housing, the top edge gasket further comprising a flexible portion extending from the front edge of the top of the housing, the top edge gasket being configured to be bent upwardly by the interior surface of the windshield so the flexible portion of the top edge gasket extends upwardly from the front edge of the top of the housing along the inner surface of the windshield when the signal lighting system is installed in the vehicle.

2. A signal lighting system as set forth in claim 1 further comprising a bottom edge gasket supported by the front edge of the bottom of the housing, the bottom edge gasket comprising a mounting portion that is secured to the bottom of the housing so the mounting portion is substantially fixed in the vertical direction relative to the front edge of the bottom of the housing, the bottom edge gasket further comprising a flexible portion extending forward from the front edge of the bottom of the housing, the flexible portion of the bottom edge gasket being configured to be bent downwardly by the interior surface of the windshield so the flexible portion of the bottom edge gasket extends downwardly from the front edge of the bottom of the housing along the inner surface of the windshield when the signal lighting system is installed in the vehicle.

3. A signal lighting system as set forth in claim 2 wherein the bottom edge gasket comprises a generally flat strip of elastomeric material when in an undeformed configuration, the mounting portion having a channel, the front edge of the bottom of the housing being received in the channel, the flexible portion of the bottom gasket extending forward from the front edge of the bottom of the housing a first distance, the mounting portion extending rearward of the front edge of the bottom gasket a second distance, the first distance being larger than the second distance.

4. A signal lighting system as set forth in claim 1 wherein the top edge gasket is configured so the flexible portion of the top edge gasket extends from the mounting portion of the top edge gasket at an angle when the top edge gasket is in an undeformed configuration.

5. A signal lighting system as set forth in claim 1 wherein the mounting portion of the top edge gasket has channel and the front edge of the top of the housing is received in the channel, the flexible portion of the top edge gasket extending from the front edge of the top of the housing a first distance, the mounting portion of the top edge gasket extending rearward of the front edge of the top of the housing a second distance, the first distance being larger than the second distance.

6. A signal lighting system as set forth in claim 1 wherein the housing further comprises a side wall extending between the top and the bottom of the housing at one side of the housing and a blind extending forward from the side wall, the blind being moveable relative to the housing for adjusting the position of the blind relative to the vehicle windshield.

7. A signal lighting system as set forth in claim 6 further comprising a fastener for releasably securing the blind to the housing, the blind having an arcuate slot for receiving the fastener and allowing the blind to be pivoted relative to the housing.

8. A signal lighting system as set forth in claim 7 wherein the arcuate slot is located in a rearward portion of the blind and the blind has top and bottom edges that converge toward a front of the blind, the arcuate slot having a radius of curvature positioned at the front edge of the bottom of the housing for pivoting the blind about an axis that is at the front edge of the bottom of the housing.

9. A signal lighting system as set forth in claim 1 wherein the pivot arm mounting base bracket comprises a retaining plate having a circular opening and a washer having a triangular shaped central opening, the washer being adapted engage the retaining plate and allow rotation of the retaining plate so the orientation of the triangular opening in the washer relative to the retaining plate can be adjusted, the triangular and circular openings being sized so they can be aligned so the vertices of the triangular opening generally coincide with the perimeter of the circular opening.

10. A signal lighting system
as set forth in claim 1, wherein at least some of the lights are part of a light module comprising a plurality of lights mounted on a base for conjoint movement with one another, the light module having an interface thereon adapted to interface with a tool to drivingly connect the tool to the light module, and
wherein the bottom of the housing has an opening aligned with the interface for inserting the tool into the housing and into engagement with the interface to adjust the orientation of the light module without dismounting the housing from the vehicle.

11. A lighting system as set forth in claim 10 further comprising a pair of fasteners on opposite sides of the interface securing the light module to the housing, wherein the bottom of the housing has additional openings aligned with the fasteners for accessing the fasteners to loosen them to facilitate the adjustment to the orientation of the light module.

12. A lighting system as set forth in claim 11 wherein the fasteners are connected to the housing and extend through arcuate slots in the light module so the light module can be rotated without removing the fasteners from the arcuate slots.

13. A lighting system as set forth in claim 11 further comprising a plurality of caps for releasably plugging the openings after the light module is adjusted.

\* \* \* \* \*